US011131976B2

(12) United States Patent
Yang et al.

(10) Patent No.: US 11,131,976 B2
(45) Date of Patent: Sep. 28, 2021

(54) DEVICE CONTROL SYSTEM, METHOD AND APPARATUS, AND GATEWAYS

(71) Applicant: TENCENT TECHNOLOGY (SHENZHEN) COMPANY LIMITED, Guangdong (CN)

(72) Inventors: Xin Yang, Shenzhen (CN); Xiao Qing Liang, Shenzhen (CN); Kai Qian, Shenzhen (CN); Hua Mao, Shenzhen (CN); Chao Hui Ding, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 641 days.

(21) Appl. No.: 16/071,138

(22) PCT Filed: Jun. 22, 2017

(86) PCT No.: PCT/CN2017/089557
§ 371 (c)(1),
(2) Date: Jul. 19, 2018

(87) PCT Pub. No.: WO2018/010533
PCT Pub. Date: Jan. 18, 2018

(65) Prior Publication Data
US 2021/0165379 A1 Jun. 3, 2021

(30) Foreign Application Priority Data

Jul. 12, 2016 (CN) .......................... 201610545949.9
Oct. 24, 2016 (CN) .......................... 201610937694.0

(51) Int. Cl.
G05B 19/042 (2006.01)

(52) U.S. Cl.
CPC ..... *G05B 19/0423* (2013.01); *G05B 19/0426* (2013.01); *G05B 2219/25186* (2013.01); *G05B 2219/2642* (2013.01)

(58) Field of Classification Search
CPC ............ G05B 19/0423; G05B 19/0426; G05B 2219/2642; G05B 2219/25186
See application file for complete search history.

(56) References Cited

U.S. PATENT DOCUMENTS

| 2011/0225090 A1* | 9/2011 | Hammad | G06Q 20/405 |
| | | | 705/44 |
| 2014/0003331 A1 | 1/2014 | Klein | |
| 2016/0266557 A1* | 9/2016 | Zhang | G05B 15/02 |

FOREIGN PATENT DOCUMENTS

| CN | 102025573 A | 4/2011 |
| CN | 104486175 A | 4/2015 |

(Continued)

OTHER PUBLICATIONS

Communication dated Nov. 26, 2018 issued by the State Intellectual Property Office of People's Republic of China in counterpart application No. 201610545949.9.

(Continued)

*Primary Examiner* — Chad G Erdman
(74) *Attorney, Agent, or Firm* — Sughrue Mion, PLLC

(57) ABSTRACT

A system, method and gateway are provided. The method is executed by a primary gateway, and includes obtaining status information from smart devices, a first portion of which belong to and communicate with the primary gateway using a first standard, and a second portion of which belong to and communicate with a secondary gateway using a second standard. The status information from the smart devices belonging to the secondary gateway is received from the secondary gateway, and the status information from the smart devices belonging to the primary gateway is received (Continued)

directly from the smart devices belonging to the primary gateway. A control instruction for controlling a second smart device is generated in response to status information from a first smart device complying with an interworking rule, where the first and second smart devices communicate using different standards. The control instruction is transmitted to the second smart device.

16 Claims, 14 Drawing Sheets

(56) References Cited

FOREIGN PATENT DOCUMENTS

| | | | |
|---|---|---|---|
| CN | 104808499 A | | 7/2015 |
| CN | 104811375 A | * | 7/2015 |
| CN | 104811375 A | | 7/2015 |
| CN | 106094754 A | | 11/2016 |

OTHER PUBLICATIONS

International Search Report of PCT/CN2017/089557 dated Aug. 25, 2017.

* cited by examiner

DEVICE CONTROL SYSTEM, METHOD AND APPARATUS, AND GATEWAYS

RELATED APPLICATION

This application is a National Stage entry of International Application No. PCT/CN2017/089557 filed on Jun. 22, 2017, which claims priority to Chinese Patent Application No. 201610545949.9, filed Jul. 12, 2016 and Chinese Patent Application No. 201610937694.0, filed Oct. 24, 2016 in the Chinese Patent Office, the disclosures of each of which are incorporated by reference herein in their entirety.

FIELD OF THE TECHNOLOGY

The present disclosure relates to the field of automatic control technology, particularly to a device control system, method and device, and gateways.

BACKGROUND OF THE DISCLOSURE in existing smart household networks, various smart household devices can access a gateway in a short-range wireless manner, such as Bluetooth or the like, and implement interworking through the gateway.

In the implementation process of the present disclosure, the applicant has discovered the following problem in related art technologies:

There are many short-range wireless manners used for smart devices, such as Bluetooth, ZigBee and the like, but in related art technologies, one gateway can only implement the interworking between the smart devices corresponding to one communication manner, so as to restrict application scenarios for the interworking of the smart devices.

SUMMARY

According to an aspect of one or more exemplary embodiments, there is provided a system comprising a primary gateway communicating according to a first communication standard; a secondary gateway communicating according to a second communication standard different from the first communication standard; and a plurality of smart devices, a first portion of which belong to and communicate with the primary gateway using the first communication standard, and a second portion of which belong to and communicate with the secondary gateway using the second communication standard. The secondary gateway is configured to receive status information from each smart device belonging to the secondary gateway, and provide the status information of the smart devices belonging to the secondary gateway to the primary gateway. The primary gateway is configured to receive status information from a smart device belonging to the primary gateway. The primary gateway is further configured to generate a control instruction for controlling a second smart device of the plurality of smart devices in response to detecting that status information from a first smart device of remaining smart devices of the plurality of smart devices complies with an interworking rule, the first smart device and the second smart device communicating using different communication standards; and transmit the control instruction to the second smart device which executes the control instruction.

According to another aspect of one or more exemplary embodiments, there is provided a method executed by a primary gateway. The method comprises obtaining status information from a plurality of smart devices, a first portion of which belong to and communicate with the primary gateway using a first communication standard, and a second portion of which belong to and communicate with a secondary gateway using a second communication standard different from the first communication standard, wherein the status information from the smart devices belonging to the secondary gateway is received from the secondary gateway, and the status information from the smart devices belonging to the primary gateway is received directly from the smart devices belonging to the primary gateway. A control instruction for controlling a second smart device of the plurality of smart devices is generated in response to detecting that status information from a first smart device of remaining smart devices of the plurality of smart devices complies with an interworking rule, the first smart device and the second smart device communicating using different communication standards. The control instruction is transmitted to the second smart device.

According to another aspect of one or more exemplary embodiments, there is provided a primary gateway comprising at least one memory configured to store computer program code; and at least one processor configured to access the at least one memory and operate according to the computer program code. The computer program code includes first obtaining code, generating code, and first sending code. The first obtaining code is configured to cause the at least one processor to obtain status information from a plurality of smart devices, a first portion of which belong to and communicate with the primary gateway using a first communication standard, and a second portion of which belong to and communicate with a secondary gateway using a second communication standard different from the first communication standard, wherein the status information from the smart devices belonging to the secondary gateway is received from the secondary gateway, and the status information from the smart devices belonging to the primary gateway is received directly from the smart devices belonging to the primary gateway. The generation code is configured to cause the at least one processor to generate a control instruction for controlling a second smart device of the plurality of smart devices in response to detecting that status information from a first smart device of remaining smart devices of the plurality of smart devices complies with an interworking rule, the first smart device and the second smart device communicating using different communication standards. The first sending code is configured to cause the at least one processor to transmit the control instruction to the second smart device.

BRIEF DESCRIPTION OF THE DRAWINGS

Exemplary embodiments will be descried herein with to the accompanying drawings, in which.

DESCRIPTION OF EXEMPLARY EMBODIMENTS

Exemplary embodiments will be described in detail herein, examples of which are illustrated in the accompanying drawings. When the following description refers to the accompanying drawings, like numerals in the different accompanying drawings indicate same or similar elements unless otherwise indicated. The implementation manners described in the following exemplary embodiments do not represent all of the implementation manners consistent with the present application. Instead, they are merely examples of apparatuses and methods consistent with some aspects of the present disclosure as detailed in the appended claims.

In the related art, a gateway supports a Bluetooth communication manner, and is connected with two smart devices, that also support the Bluetooth communication manner. The gateway is connected with Bluetooth between the two smart devices to obtain status information of the two smart household devices; and when the status information of one of the smart devices satisfies preset conditions, a control instruction is sent to the other smart device through Bluetooth connection to implement interworking between the two smart devices.

However, as discussed above, there are many short-range wireless manners used for smart devices, and thus application scenarios for the interworking of the smart devices are restricted.

In order to solve the problem that in related technologies, one gateway can only implement the interworking between smart devices corresponding to one communication manner, so as to restrict the application scenarios for the interworking of the smart devices, the exemplary embodiments provide a device control system, method and apparatus, and gateways. The technical schemes are as follows:

The technical scheme provided by the exemplary embodiments of the application may have the following beneficial effects:

receive the status information including the current working status of the first device through the second gateway, and defect whether the status information satisfies preset conditions; if a first message satisfies the preset conditions, send a control instruction to the second device, or send the control instruction to a third gateway according to a third communications standard and forward the control instruction to the second device by the third gateway, and then, perform the operation corresponding to the preset conditions by the second device, so that the smart devices supporting different communications standards in a local area network may implement interworking control, thereby achieving the effect of widening the application scenarios for the interworking of smart devices.

It should be understood that the general description above and detailed description hereafter are merely exemplary and explanatory, but are not intended to limit the present disclosure.

Figure 1:
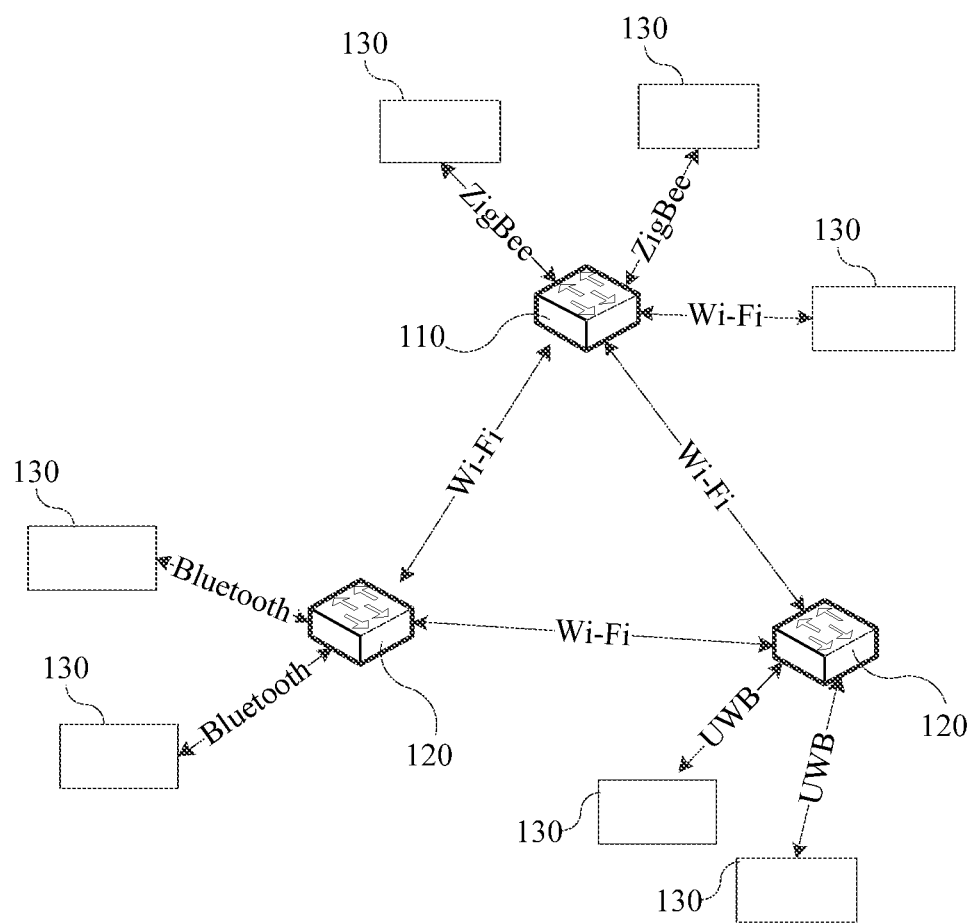
FIG. 1 is a schematic diagram of an involved implementation environment of the present disclosure.

FIG. 1 is a schematic diagram of an involved implementation environment of the present disclosure. The implementation environment may include at least two gateways, wherein the at least two gateways include a primary gateway 110 and at least one secondary gateway 120 (two shown in FIG. 1); and the implementation environment also includes at least two smart devices 130.

The primary gateway 110 and the at least one secondary gateway 120 may be routers, household gateways or other devices. The at least two smart devices 130 respectively belong to the primary gateway 110 and the at least one secondary gateway 120.

The smart device 130 may be a smart TV, a set-top box, a smart loudspeaker, a smart refrigerator, a smart air conditioner, a smart camera, a smart curtain, a smart infrared device or other smart household devices. The at least two smart devices 130 respectively support one communications standard, for example, Wireless Fidelity (WiFi), Bluetooth, ZigBee, Ultra Wideband (UWB) and user-defined communications standards based on a free frequency band (such as 433 MHz).

The primary gateway 110 is connected with the at least one secondary gateway 120 respectively by using a specified communications standard, for example, in FIG. 1, the primary gateway 110 is connected with the at least one secondary gateway 120 respectively by using a WiFi communications standard.

The primary gateway 110 and the at least one gateway 120 also respectively support another communications standard in addition to the specified communications standard. Besides, the primary gateway 110 and the at least one gateway 120 respectively communicate with respective smart devices 130 belonging to the primary gateway 110 and the at least one gateway 120 by using different communications standards. For example, in the implementation environment as shown in FIG. 1, the primary gateway 110 is also connected to a smart device 130 supporting ZigBee by using a ZigBee communications standard; one of the two secondary gateways is connected to a smart device 130 supporting Bluetooth by using a Bluetooth communications standard, and the other secondary gateway is connected to a smart device 130 supporting UWB by using a UWB communications standard.

In the meanwhile, a smart device 130 supporting a specified communications standard may communicate with the primary gateway 110 by using the specified communications standard, or may communicate with a specified secondary gateway 120 by using the specified communications standard. For example, in the implementation environment as shown in FIG. 1, the primary gateway 110 is also connected to a smart device 130 supporting WiFi by using a WiFi communications standard.

It should be specially noted that there are two secondary gateways 120 in the implementation environment as shown in FIG. 1, but in practical application, there may be only one secondary gateway 120, or there may be more than two secondary gateways 120.

By taking the implementation environment as shown in FIG. 1 as an example, the following introduces and illustrates the technical schemes provided by the exemplary, embodiments.

Figure 2:
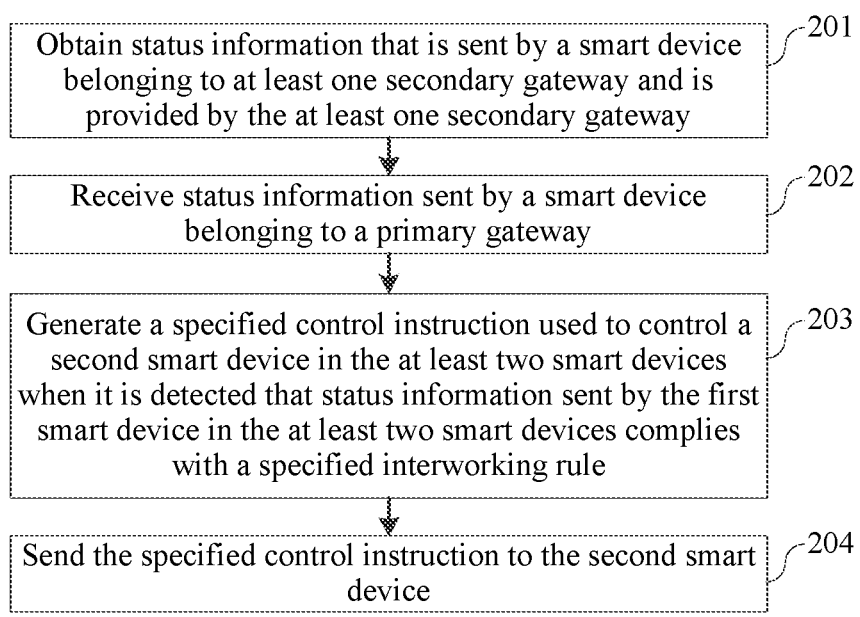
FIG. 2 is a flow chart of a device control method shown according to an exemplary embodiment.

FIG. 2 is a flow chart of a device control method shown according to an exemplary embodiment. The method may be applied to the primary gateway 110 in the implementation environment as shown in FIG. 1. As shown in FIG. 2, the device control method may include the following steps:

Step 201: Obtain status information that is sent by a smart device belonging to at least one secondary gateway and is provided by the at least one secondary gateway.

Step 202: Receive the status information sent by the smart device belonging to the primary gateway.

Step 203: Generate a specified control instruction used to control a second smart device when it is detected that status information sent by a first smart device complies with a specified interworking rule.

The first smart device is one of the at least two smart devices, the second smart device is another one of the at least two smart devices, the first smart device communicates with a corresponding gateway by using a first communications standard, the second smart device communicates with a corresponding gateway by using a second communications standard, and the first communications standard and the second communications standard are two different communications standards.

Step 204: Send the specified control instruction to the second smart device.

Accordingly, according to the device control method provided by the exemplary embodiment, by obtaining status information that is sent by a smart device belonging to the at least one secondary gateway and is provided by the at least one secondary gateway, receiving status information sent a the smart device belonging to the primary gateway, generating a specified control instruction used to control a second smart device when it is detected that status information sent by the first smart device complies with a specified interworking rule, and sending the specified control instruction to the second smart device, the smart devices supporting different communications standards in one local area network may implement interworking control, thereby achieving the effect of widening application scenarios for the interworking of smart devices.

Figure 3:
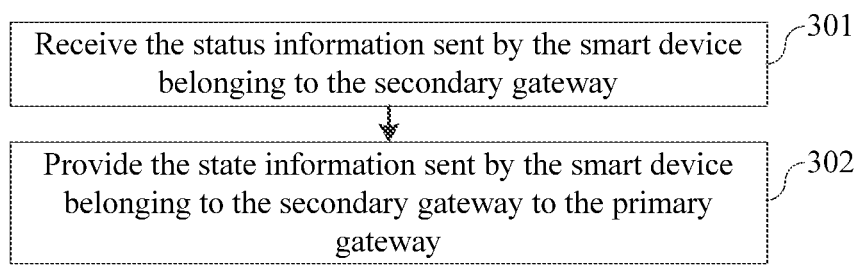
FIG. 3 is a flow chart of a device control method shown according to an exemplary embodiment.

FIG. 3 is a flow chart of a device control method shown according to an exemplary embodiment. The method may be applied to the primary gateway 120 in the implementation environment as shown in FIG. 1. As shown in FIG. 3, the device control method may include the following steps:

Step 301: Receive status information sent by a smart device belonging to a secondary gateway.

Step 302: Provide the status information sent by the smart device belonging to the secondary gateway to a primary gateway.

Objectives of step 302 are that, when it is detected that status information sent by a first smart device complies with a specified interworking rule, the primary gateway generates a specified control instruction used to control a second smart device, and sends the specified control instruction to the second smart device. The first smart device is one of at least two smart devices, the second smart device is another one of the at least two smart devices, the first smart device communicates with a corresponding gateway by using a first communications standard, the second smart device communicates with a corresponding gateway by using a second communications standard, and the first communications standard and the second communications standard are two different communications standards.

Accordingly, according to the device control method provided by the exemplary embodiment, by receiving status information sent by a smart device belonging to a secondary gateway, and providing the status information sent by the smart device belonging to the secondary gateway to the primary gateway. the primary gateway generates a specified control instruction used to control a second smart device and sends the specified control instruction to the second smart device when it is detected that status information sent by a first smart device complies with a specified interworking rule, so that the smart devices supporting different communications standards in one local area network may implement interworking control, thereby achieving the effect of widening the application scenarios for the interworking of smart devices.

Figure 4A:
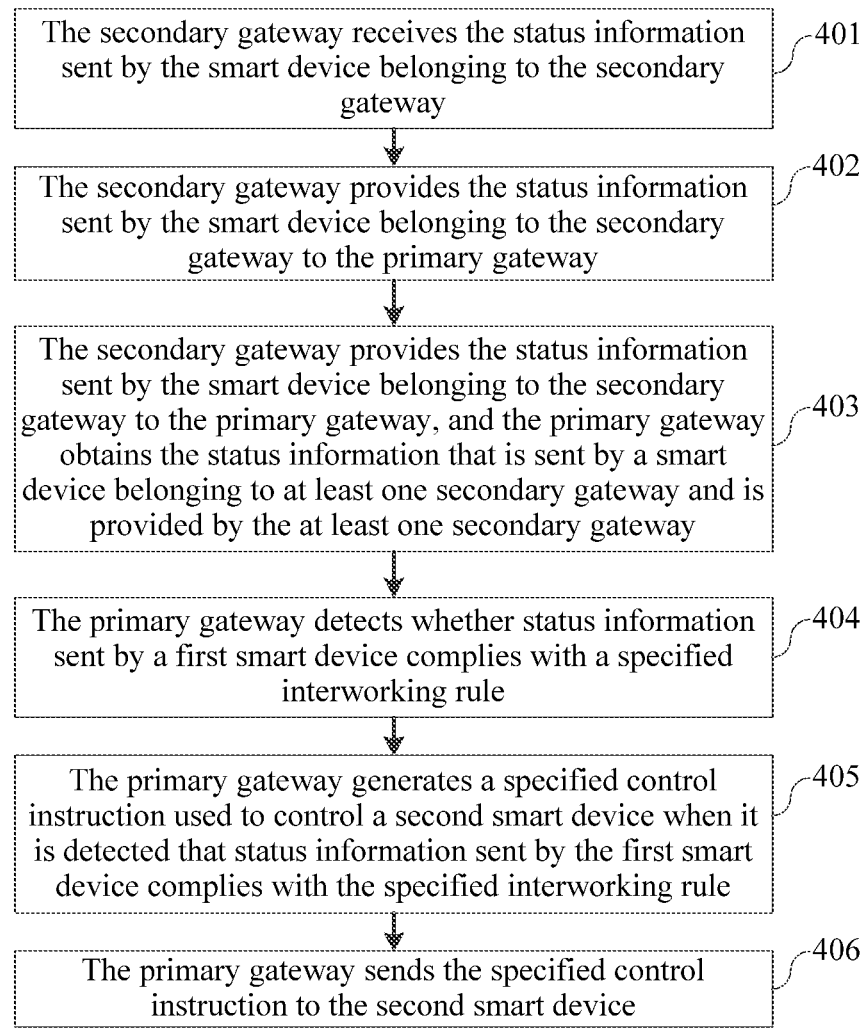
FIG. 4A is a flow chart of a device control method shown according to an exemplary embodiment.

FIG. 4A is a flow chart of a device control method shown according to an exemplary embodiment, and the method may be applied to the implementation environment as shown in FIG. 1. As shown in FIG. 4A, the device control method may include the following steps:

Step 401: Receive, by a secondary gateway, status information sent by a smart device belonging to the secondary gateway.

Taking the implementation environment as shown in FIG. 1 as an example, the secondary gateway in the step may be any one of at least one secondary gateway in FIG. 1. In FIG. 1, the gateways communicate with each other by using the specified communications standard, for example, the primary gateway and the secondary gateway are connected with each other by using the WiFi communications standard, and all smart devices supporting the WiFi communications standard are connected with the primary gateway.

The smart device belonging to the secondary gateway refers to a device capable of performing network connection through the secondary gateway.

The status information of the smart device belonging to the secondary gateway may be current working status information of the device. For example, the status information may be an open status or a closed status, a working mode or a working position, and various working parameters of the smart device. Taking a smart air conditioner as the smart device as an example, the working status information may be information including an on state or an off state of the air conditioner, a working mode (refrigeration mode, heating mode, ventilation mode, drying mode or the like) of the air conditioner, a current working parameter (voltage, current, power or the like), ambient temperature detected currently and the like.

Step 402: The secondary gateway provides the status information sent by the smart device belonging to the secondary gateway to a primary gateway, and the primary gateway obtains the status information that is sent by the smart device belonging to the at least one secondary gateway and is provided by the at least one secondary gateway.

In the exemplary embodiment, the status information of one smart device may be used as control condition information of another smart device (the control condition information is information used to judge whether to control the other smart device). In the method provided by the exemplary embodiment, the primary gateway performs the step of judging the control condition information, and therefore, the secondary gateway provides the status information sent by the smart device belonging to the secondary gateway to the primary gateway.

Step 403: The primary gateway receives the status information sent by a smart device belonging to the primary gateway.

Taking the implementation environment as shown in FIG. 1 as an example, in the exemplary embodiment, the primary gateway may be directly connected with a smart device, and at this time, the primary gateway may directly obtain the status information of the smart device belonging to the primary gateway.

Step 404: The primary gateway detects whether the status information sent by a first smart device complies with a specified interworking rule.

Taking the implementation environment as shown in FIG. 1 as an example, the first smart device is one of at least two smart devices.

In some exemplary embodiments, the specified interworking rule is an interworking rule related to the first smart device, the primary gateway may pre-store the specified interworking rule, and the primary gateway detects whether the status information sent by the first smart device complies with the interworking rule.

Figure 4B:
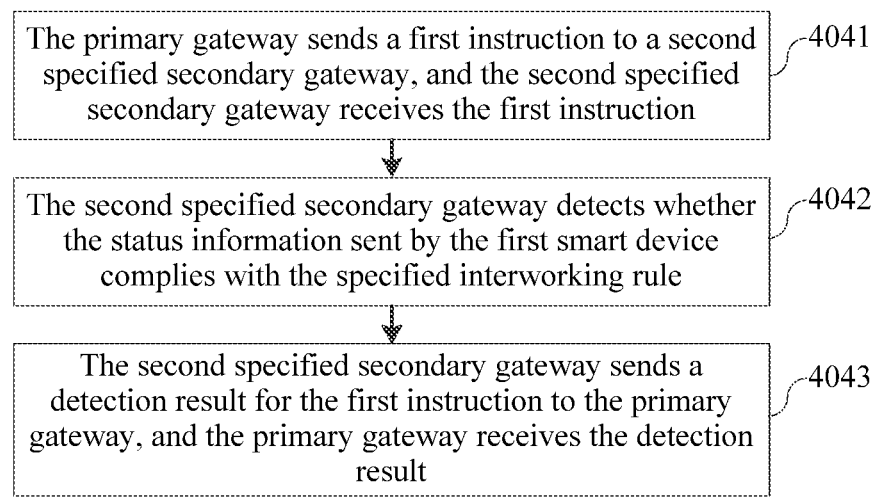
FIG. 4B is a flow chart of a rule detection method of the exemplary embodiment as shown in FIG. 4A.

Or, in another possible implementation manner, in view of the factor of load balancing, the primary gateway may specify a secondary gateway to perform the foregoing step of rule detection, for example, please refer to FIG. 4B, which shows a flow chart of an involved rule detection method of the exemplary embodiment. As shown in FIG. 4B, the method may be as shown in step 4041 to step 4043:

Step 4041: The primary gateway sends a first instruction to a second specified secondary gateway, and the second specified secondary gateway receives the first instruction.

The first instruction is used to indicate the second specified secondary gateway to detect whether the status information sent by the first smart device complies vi the specified interworking rule.

In some exemplary embodiments, the first instruction sent by the primary gateway to the second specified secondary gateway may include the status information of the first smart device and the specified interworking rule, i.e., the primary gateway sends the status information of the smart device to be detected and the corresponding interworking rule together to the secondary gateway, and the secondary gateway directly performs detection according to the first instruction.

In some exemplary embodiments, the first instruction sent by the primary gateway to the second specified secondary gateway may only include the status information of the first smart device. Besides, the second specified secondary gateway obtains the specified interworking rule from the primary gateway or a server. Before the primary gateway sends the first instruction, the secondary gateway has possibly stored the corresponding interworking rule, for example, the secondary gateway previously obtains all available interworking rules (including the specified interworking rule) from the primary gateway or the server, the primary gateway only uses the status information of the first smart device in the first instruction, and the secondary gateway inquires the specified interworking rule related to the first smart device. Or, at the time of receiving, the secondary gateway does not store the specified interworking rule, and at this time, the secondary gateway may make a request to obtain the specified interworking rule related to the first smart device from the primary gateway or the server.

Step 4042: The second specified secondary gateway detects whether the status information sent by the first smart device complies with the specified interworking rule.

In the exemplary embodiment, the second specified secondary gateway may be a secondary gateway, that is determined from at least one secondary gateway by the server or the primary gateway and has more surplus computing resources or a lower utilization ratio of computing resources.

Step 4043: The second specified secondary gateway sends a detection result for the first instruction to the primary gateway, and the primary gateway receives the detection result.

Step 405: The primary gateway generates a specified control instruction used to control a second smart device when it is detected that status information sent by the first smart device complies with the specified interworking rule.

The second smart device is another one of the at least two smart devices other than the first smart device, and the first smart device and the second smart device respectively communicate with corresponding gateways by using different communications standards, i.e., the first smart device communicates with a corresponding gateway by using a first communications standard, the second smart device communicates with a corresponding gateway by using a second communications standard, and the first communications standard and the second communications standard are two different communications standards. For example, taking the implementation environment as shown in FIG. 1 as an example, assuming that the first smart device is a WiFi device (namely the smart device connected with the primary gateway 110 by using the WiFi communications standard in FIG. 1), the second smart device may be a ZigBee device (namely the smart device connected with the primary gateway 110 by using the ZigBee communications standard in FIG. 1), a Bluetooth device (namely the smart device connected with the secondary gateway 120 by using the Bluetooth communications standard in FIG. 1) or a UWB device (namely the smart device connected with the secondary gateway 120 by using the UWB communications standard in FIG. 1). In some exemplary embodiments, in the exemplary embodiment, the first smart device and the second smart device may also communicate with a same gateway by using a same communications standard.

In some exemplary embodiments, in the exemplary embodiment, the specified interworking rule may be backed up in a server. Specifically, the primary gateway may send a backup request to the server, and the server backs up the specified interworking rule according to the backup request.

In some exemplary embodiments, the primary gateway may send the backup request to the server when adding or deleting an interworking rule, so that the server backs up the changed interworking rule.

In the exemplary embodiment, the interworking rule may include an interworking condition and an interworking action, and complying with the interworking rule refers to complying with the interworking condition in the interworking rule. The interworking condition means that working status information of a corresponding smart device is in a specified state, and the interworking action refers to at least one operation performed by another at least one smart device. For example, in a certain interworking rule, the interworking condition may be that the smart air conditioner (first smart device) is in a refrigeration state, and the interworking action corresponding to the interworking condition is to close a smart door/window (second smart device). When the working status information sent by the smart air conditioner satisfies the interworking condition of being in the refrigeration state, the primary gateway generates a control instruction that instructs the smart door/window to close.

Step 406: The primary gateway sends the specified control instruction to the second smart device.

When the gateway corresponding to the second smart device is the primary gateway, the primary gateway directly sends the specified control instruction to the second smart device by using the communications standard corresponding to the second smart device.

For example, the second smart device may be the WiFi smart device or ZigBee device as shown in FIG. 1. At this time, the primary gateway may directly send the control instruction to the second smart device.

In some exemplary embodiments, when the gateway corresponding to the second smart device is the first specified secondary gateway, the primary gateway sends the specified control instruction to the first specified secondary gateway, and the first specified secondary gateway sends the specified control instruction to the second smart device by using the communications standard corresponding to the second smart device.

For example, the second smart device may be the Bluetooth device or UWB device as shown in FIG. 1. At this time, the primary gateway may firstly send the control instruction to the first specified secondary gateway corresponding to the second smart device by using the specified communications standard (namely WiFi), and the first instruction secondary gateway sends the control instruction to the second smart device by using the communications standard (Bluetooth or UWB) corresponding to the second smart device.

The smart device performs the corresponding operation according to the control instruction after obtaining the control instruction.

In some exemplary embodiments, in the scheme as shown in the present disclosure, when a fault occurs in the primary gateway, the at least one secondary gateway may determine a new primary gateway so as to implement normal interworking among smart devices connected with the secondary gateways. Specifically, when a fault occurs in the primary gateway, the secondary gateways determine a secondary gateway ranking first as the new primary gateway according to a specified sequencing rule.

The specified sequencing rule may be: sequencing in chronological order based on installation time, or sequencing in chronological order based on time of binding to a user account.

Specifically, as for any secondary gateway in the at least one secondary gateway, when the secondary gateway determines that a fault occurs in the primary gateway, the secondary gateway may sequence the secondary gateways in chronological order based on installation time or in chronological order based on a time of binding, and the secondary gateway ranking first (namely the first one installed or bound) serves as the new primary, gateway.

In some exemplary embodiments, when a fault occurs in the primary gateway, the rest secondary gateways may elect the new primary gateway in a polling manner. A specific process may be: any one of the secondary gateways temporarily determines itself as the primary gateway, wherein the any one of the secondary gateways may be specified by a random number generating program; and collect installation time of the other secondary gateways or collect the time of binding to the user account of the other secondary gateways, and if a secondary gateway, of which the installation time or the time of binding to the user account is earlier than that of the temporary primary gateway, exists, determine the existing secondary gateway as the new primary gateway. After all the secondary gateways in a local area network are compared with the secondary gateway which is temporarily determined as the primary gateway according to a specified sequencing rule, the secondary gateway which is temporarily determined as the primary gateway is determined as the new primary gateway.

In some exemplary embodiments, when a fault occurs in the primary gateway, all of the rest secondary gateways may send a reelection request to a server, and the server searches out the secondary gateway which is installed earliest or bound with a user account number earliest according to stored chronological order based on installation time of the secondary gateways or stored chronological order based on time of binding. Or, after detecting that a fault occurs in the primary gateway, the server actively searches out the secondary gateway which is installed earliest or bound with the user account number earliest. The secondary gateway searched out by the server is the new primary gateway.

At the beginning of establishment of the local area network, the primary gateway may be determined according to the method above; or at the beginning of establishment of the local area network, the primary gateway may be determined by the user; and when a fault occurs in the primary gateway later, the secondary gateways automatically determine the new primary gateway through step 501.

In some exemplary embodiments, when a secondary gateway is determined as the new primary gateway, the secondary gateway (namely the new primary gateway) obtains the specified interworking rule that is backed up from the server.

For example, after the new primary gateway is determined, the new primary gateway sends a request for obtaining the interworking rule that is backed up before obtaining (including the foregoing specified interworking rule) to the server, and thus, the new primary gateway may control the interworking of the smart devices in the network.

In some exemplary embodiments, in the scheme as shown in the exemplary embodiment, when a binding relationship between the primary gateway and the user account is cancelled, any secondary gateway also cancels a binding relationship between the secondary gateway and the user account.

In the use process of the exemplary embodiment, the primary gateway and the secondary gateways may respectively be bound to a user account number (account numbers of all members of a household account number or a user account number are considered as one user account number). When the binding relationship between the primary gateway and the user account number is cancelled, the binding relationships between the rest secondary gateways and the user account number are also cancelled, thereby avoiding the inconvenience of sequentially cancelling the binding relationships between the secondary gateways and the user account number.

Accordingly, according to the device control method provided by the exemplary embodiment, by receiving status information including a current working status of a first device through a second gateway, defecting whether the status information satisfies preset conditions, sending a control instruction to a second device or sending the control instruction to a third gateway according to a third communications standard, and forwarding the control instruction to the second device by the third gateway if a first message satisfies preset conditions, and then, performing an operation corresponding to the preset conditions by the second device, smart devices supporting different communications standards in a local area network may implement interworking control, thereby achieving the effect of widening application scenarios for the interworking of smart devices.

In the scheme as shown in the present disclosure, besides specifying a second secondary gateway to perform detection on the specified interworking rule, the primary gateway may also specify one or more secondary gateways to perform data storage, i.e., specify one or more secondary gateways to store status information sent from the smart devices, thereby avoiding the problem of insufficient storage space of the primary gateway since the status information sent by all the smart devices is stored in the primary gateway. For details, please refer to a method as shown in FIG. 5.

Figure 5:
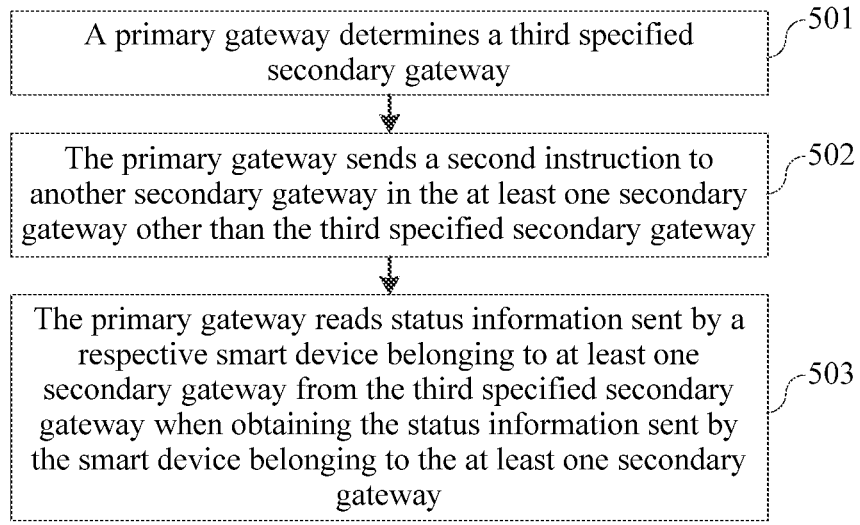
FIG. 5 is a flow chart of a data storage method shown according to an exemplary embodiment.

FIG. 5 is a flow chart of a data storage method shown according to an exemplary embodiment, and the method may be applied to the implementation environment as shown in FIG. 1. As shown in FIG. 5, the data storage method may include the following steps:

Step 501: The primary gateway determines a third specified secondary gateway.

Specifically, when the quantity of at least one secondary gateway is greater than 1, the primary gateway may determine the third specified secondary gateway configured to store the status information sent by the smart devices from the at least one secondary gateway. For example, the primary gateway may send a request for obtaining respective surplus storage space capacity of the secondary gateways to the secondary gateways, and determine the one or more secondary gateways with the maximum surplus storage space capacity as the third specified secondary gateway.

Step 502: The primary gateway sends a second instruction to another secondary gateway.

The another secondary gateway is a gateway in the at least one secondary gateway other than the third specified secondary gateway; and when the second instruction is used to indicate that the another secondary gateway is providing status information sent by a smart device belonging to the respective secondary gateway to the primary gateway, the status information sent by the smart device belonging to the respective secondary gateway is sent to the third specified secondary gateway.

When the third specified secondary gateway receives the status information sent by the smart device belonging to the third specified secondary gateway, the status information sent by the smart device belonging to the third specified secondary gateway and the status information sent by the smart device belonging to the another secondary gateway are stored together.

Step 503: The primary gateway reads status information sent by a respective smart device belonging to the at least one secondary gateway from the third specified secondary gateway when obtaining the status information sent by the respective smart device belonging to the at least one secondary gateway.

In some exemplary embodiments, in the exemplary embodiment, when receiving the status information sent by a smart device belonging to the primary gateway, the primary gateway may firstly send the status information sent by the smart device belonging to the primary gateway to the third specified gateway for storage, and then read the status information sent by the smart device belonging to the primary gateway and status information sent by the respective smart device belonging to the at least one secondary gateway together from the third specified gateway when detecting an interworking rule.

Accordingly, according to the data storage method as shown in the exemplary embodiment, a primary gateway sends a second instruction to another secondary gateway in at least one secondary gateway other than a third specified secondary gateway, so as to indicate the another secondary gateway to send status information sent by a respective corresponding smart device to the third specified secondary gateway, and the primary gateway reads the status information sent by a smart device belonging to the at least one secondary gateway from the third specified secondary gateway, thereby avoiding the problem of insufficient storage space of the primary gateway since status information sent by all smart devices is stored in the primary gateway, and meanwhile achieving the effect of enhancing the utilization ratio of storage space of the secondary gateways in a local area network.

The following introduces an apparatus exemplary embodiment of the present disclosure, which may be used to perform the method exemplary embodiment of the present disclosure. For details that are not disclosed in the apparatus exemplary embodiment, please refer to the method exemplary embodiment.

Figure 6:
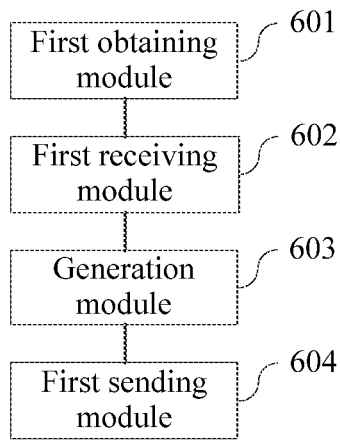
FIG. 6 is a structure block diagram of a device control apparatus shown according to an exemplary embodiment.

FIG. 6 is a structure block diagram of a device control apparatus shown according to an exemplary embodiment. The device control apparatus may be implemented as the whole or part of the primary gateway 110 in the implementation environment as shown in FIG. 1 in a manner of hardware or a combination of software and hardware. The device control apparatus may include: a first obtaining module 601, a first receiving module 602, a generation module 603 and a first sending module 604.

The first obtaining module is configured to obtain status information that is sent by a smart device belonging to at least one secondary gateway and is provided by the at least one secondary gateway.

The first receiving module 602 is configured to receive status information sent by a smart device belonging to the primary gateway.

The generation module 603 is configured to generate a specified control instruction used to control a second smart device when it is detected that status information sent by a first smart device complies with a specified interworking rule, wherein the first smart device is one of at least two smart devices, the second smart device is another one of the at least two smart devices, the first smart device communicates with a corresponding gateway by using a first communications standard, the second smart device communicates with a corresponding gateway by using a second communications standard, and the first communications standard and the second communications standard are two different communications standards.

The first sending module 604 is configured to send the specified control instruction to the second smart device.

In some exemplary embodiments, the first sending module 604 includes: a first sending unit and a second sending unit.

The first sending unit is configured to send, when the gateway corresponding to the second smart device is the primary gateway, the specified control instruction to the second smart device by using the communications standard corresponding to the second smart device.

The second sending unit is configured to send, when the gateway corresponding to the second smart device is a first specified secondary gateway, the specified control instruction to the first specified secondary gateway, so that the first specified secondary gateway sends the specified control instruction to the second smart device by using the second communications standard corresponding to the second smart device.

In some exemplary embodiments, the apparatus also includes: a backup module, configured to send a backup request to a server, wherein the backup request is used to instruct the server to back up the specified interworking rule.

In some exemplary embodiments, the apparatus also includes:

a second sending module, configured to send a first instruction to a second specified secondary gateway, wherein the first instruction is used to instruct the second specified secondary gateway to detect whether the status information sent by the first smart device complies with the specified interworking rule; and a second receiving module, configured to receive a detection result that is sent by the second specified secondary gateway for the first instruction.

In some exemplary embodiments, the apparatus also includes: a third sending module.

The third sending module is configured to send, when the quantity of the at least one secondary gateway is greater than 1, a second instruction to another secondary gateway, wherein the second instruction is used to instruct the another secondary gateway to send, to the third specified secondary gateway, status information sent by a respective corresponding smart device; and the another secondary gateway is a gateway in the at least one secondary gateway other than the third specified secondary gateway.

The first obtaining module is specifically configured to read, from the third specified secondary gateway, the status information sent by the smart device belonging to the at least one secondary gateway.

In some exemplary embodiments, in the apparatus, the at least two gateways communicate with each other by using a specified communications standard, and the primary gateway communicates with a smart device supporting the specified communications standard.

Accordingly, according to the device control apparatus provided by the exemplary embodiment, by defecting whether status information satisfies preset conditions, sending a control instruction to a second device or sending the control instruction to a third gateway according to a third communications standard and forwarding the control instruction to the second device by the third gateway if a first message satisfies the preset conditions, and then, performing an operation corresponding to the preset conditions by the second device, smart devices supporting different communications standards in a local area network may implement interworking control, thereby achieving the effect of widening application scenarios for the interworking of smart devices.

Figure 7:
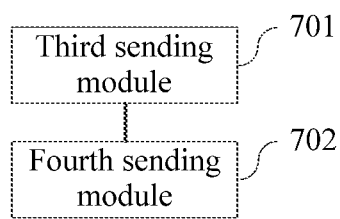
FIG. 7 is a structure block diagram of a device control apparatus shown according to an exemplary embodiment.

FIG. 7 is a structure block diagram of a device control apparatus shown according to an exemplary embodiment. The device control apparatus may be implemented as the whole or part of the secondary gateway 120 in the implementation environment as shown in FIG. 1 in a manner of hardware or a combination of software and hardware. The device control apparatus may include: a third receiving module 701 and a fourth sending module 702.

The third receiving module 701 is configured to receive status information sent by a smart device belonging to the secondary gateway.

The fourth sending module 702 is configured to provide the status information sent by the smart device belonging to the secondary gateway to a primary gateway, so that the primary gateway generates a specified control instruction used to control a second smart device and sends the specified control instruction to the second smart device when it is detected that status information sent by a first smart device complies with a specified interworking rule.

The first smart device is one of at least two smart devices, the second smart device is another one of the at least two smart devices, the first smart device communicates with a corresponding gateway by using a first communications standard, the second smart device communicates with a corresponding gateway by using a second communications standard, and the first communications standard and the second communications standard are two different communications standards.

In some exemplary embodiments, the apparatus includes: a determining module.

The determining module is configured to determine, when a fault occurs in the primary gateway, a secondary gateway ranking first as a new primary gateway according to a specified sequencing rule; and the specified sequencing rule is: sequencing in chronological order based on installation time, or sequencing in chronological order based on a time of binding to a user account.

In some exemplary embodiments, the apparatus includes: a second obtaining module.

The second obtaining module is configured to obtain the specified interworking rule from a server when the secondary gateway is determined as the new primary gateway.

In some exemplary embodiments, the apparatus includes a binding cancellation module.

The binding cancellation module is configured to cancel a binding relationship between the secondary gateway and a user account when a binding relationship between the primary gateway and the user account is cancelled.

Accordingly, by receiving status information sent by a smart device belonging to a secondary gateway, and providing the status information sent by the smart device belonging to the secondary gateway to a primary gateway so that the primary gateway generates a specified control instruction used to control a second smart device and sends the specified control instruction to the second smart device when it is detected that status information sent by a first smart device complies with a specified interworking rule, smart devices supporting different communications standards in one local area network may implement interworking control, thereby achieving the effect of widening application scenarios for the interworking of smart devices.

The exemplary embodiment also provides a device control system. The system may include a primary gateway, at least one secondary gateway and at least two smart devices. For the devices in the system and connecting manners thereof, refer to the implementation environment as shown in FIG. 1.

The primary gateway is configured to perform all or parts of the steps in the method as shown in FIG. 2, or perform all or parts of the steps performed by the primary gateway in the method as shown in FIG. 4A or 5.

The secondary gateway is configured to perform all or parts of the steps in the method as shown in FIG. 3, or perform all or parts of the steps performed by the secondary gateway in the method as shown in FIG. 4A or 5.

Figure 8:
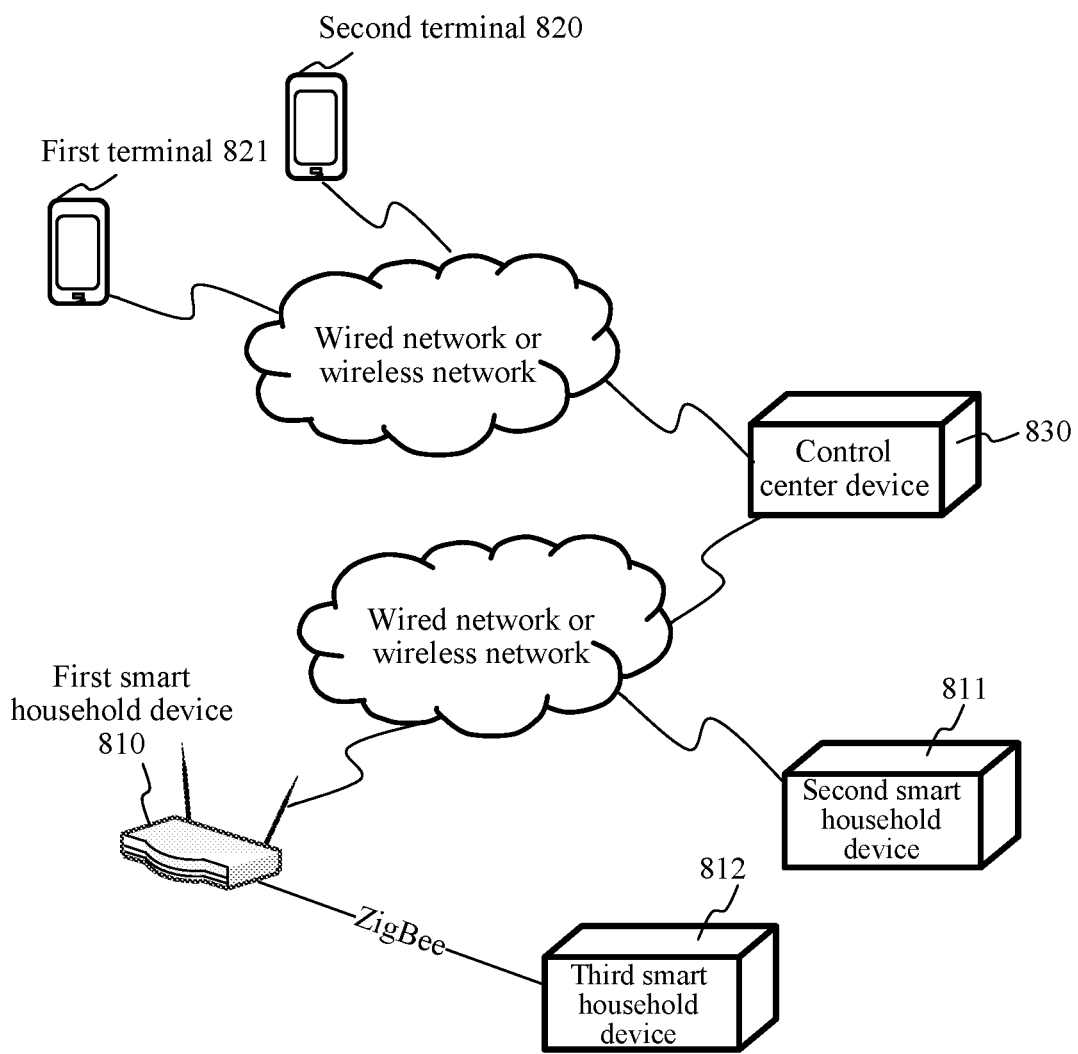
FIG. 8 is an architecture schematic diagram of a smart household system provided by some exemplary embodiments.

FIG. 8 is an architecture schematic diagram of a smart household system provided by parts of the exemplary embodiments. Smart household devices may include: a first smart household device 810, a second smart household device 811, a third smart household device 812, a second terminal 820, a first terminal 821 and a control center device 830.

The first smart household device 810 is connected with the control center device 830 through a wired network or wireless network. In some exemplary embodiments, the first smart household device 810 is a gateway device, and the gateway device may be bound with a plurality of smart household devices, and provide network service of connection to the control center device 830 for the plurality of smart household devices. Schematically, the first smart household device 810 is bound with the third smart household device 812. In some exemplary embodiments, the first smart household device 810 is connected with the third smart household device 812 by using a specified short-range wireless communication technology. The specified short-range wireless communication technology is any communication technology of Bluetooth technology, Zigbee protocol technology, WiFi (Wireless-Fidelity) technology or z-wave communication technology.

The second smart household device 811 is connected with the control center device 830 through a wired network or wireless network, and the second smart household device 811 and the first smart household device 810 are bound to a same user account number. The second terminal 820 may be a user terminal of an administrator; and the second terminal 820 has a control right on the first smart household device 810 and the second smart household device 811. In some exemplary embodiments, the user account number of the administrator has logged in the second terminal 820, and the user account number binds the first smart household device 810, the second smart household device 811 and the third smart household device 812 at the same time. The second terminal 820 is connected with the control center device 830 through a wired network or wireless network.

The first terminal 821 may be a user terminal of a friend of the administrator, and also may be a user terminal of a family member, a colleague, or a customer, or the like of the administrator; and in a use scenario of the smart household system, in order to enable the person above to have a function of using parts of the devices in the smart household system, the administrator has shared the control right on the first smart household device to the first terminal 821, wherein the first terminal 821 is connected with the control center device 830 through a wired network or wireless network.

The control center device 830 is generally a server, or a gateway device, or even the second terminal 8:20 per se. The control center device 830 has the capacity of performing right management, right control and right sharing on each smart household device.

For example, in a possible implementation manner, the foregoing control center device 830 may be the primary gateway in the implementation environment as shown in FIG. 1, or the control center device 830 may also be the secondary gateway in the implementation environment as shown in FIG. 1. The foregoing first smart household device 810, second smart household device 811 and third smart household device 812 may be respectively connected with different gateways in the implementation environment as shown in FIG. 1 by using different communications standards, or any two or three of the foregoing first smart household device 810, second smart household device 811 and third smart household device 812 may be connected with a same gateway by using a same communications standard.

Or, the control center device 830 may be a server, and the first smart household device 810 may be the primary gateway in the implementation environment as shown in FIG. 1; or, the control center device 830 may be the primary gateway in the implementation environment as shown in FIG. 1, and the first smart household device 810 may be the secondary gateway in the implementation environment as shown in FIG. 1. The second smart household device 811 and the third smart household device 812 may be respectively connected with different gateways in the implementation environment as shown in FIG. 1 by using different communications standards, or the second smart household device 811 and the third smart household device 812 may be connected with a same gateway by using a same communications standard.

Taking the system architecture as shown in FIG. 8 as an example, the following introduces and illustrates the technical schemes provided by the exemplary embodiments.

Figure 9:
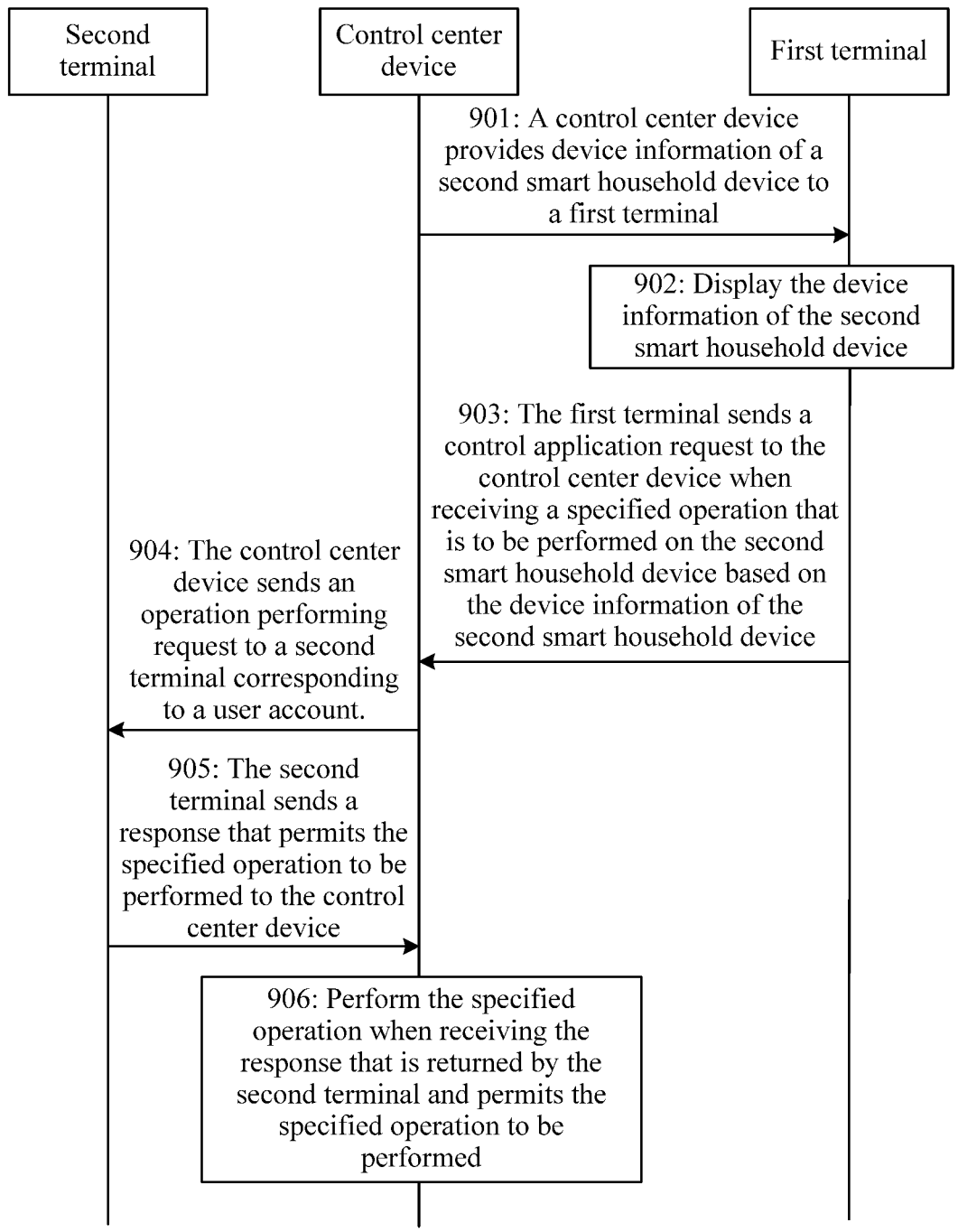
FIG. 9 is a flow chart of a device control method shown according to an exemplary embodiment.

FIG. 9 is a flow chart of a device control method shown according to an exemplary embodiment. The method may be applied to the smart household system as shown in FIG. 8. As shown in FIG. 9, the device control method may include the following steps:

Step 901: A control center device provides device information of a second smart household device to a first terminal.

The first terminal shares a control right on the first smart household device, and the first smart household device and the second smart household device are bound to a same user account number. In some exemplary embodiments, the user account number is user account number of an administrator, and has logged in a second terminal.

Correspondingly, the first terminal obtains the device information of the second smart household device from the control center device.

Step 902: The first terminal displays the device information of the second smart household device.

Step 903: The first terminal sends a control application request to the control center device when receiving a specified operation that is to be performed on the second smart household device based on the device information of the second smart household device.

Correspondingly, the control center device receives the control application request sent by the first terminal.

In the process of implementing the device control method provided by the exemplary embodiment, the control application request is a request sent by the first terminal when the first terminal receives a specified operation that is to be performed on the second smart household device based on the device information of the second smart household device.

Step 904: The control center device sends an operation performing request to the second terminal corresponding to the user account number.

The operation performing request is used for requesting a permission to perform the specified operation.

Step 905: The second terminal sends, to the control center device, a response that permits the specified operation to be performed.

Step 906: The control center device performs the specified operation when receiving the response that is returned by the second terminal and permits the specified operation to be performed.

Accordingly, according to the device control method provided by exemplary embodiment, on the premise that a first terminal shares a control right on a first smart household device, device information of a second smart household device is provided to the first terminal through a control center device, the second smart household device and the first smart household device are devices that are bound to a same user account number, and the first terminal obtains the device information of the second smart household device and sends, to the control center device, a control application request to be performed on the second smart household device, thereby implementing the control on the second smart household device; thus, even if the first terminal does not share the control right on the second smart household device, since the first smart household device and the second smart household device are bound to a same user account number, the first terminal may also actively send a control request for controlling the second smart household device; and the effect that a device sharing process may be actively initiated by the second terminal of an owner user, and may be actively initiated also by the first terminal of a shared user is achieved.

Figure 10A:
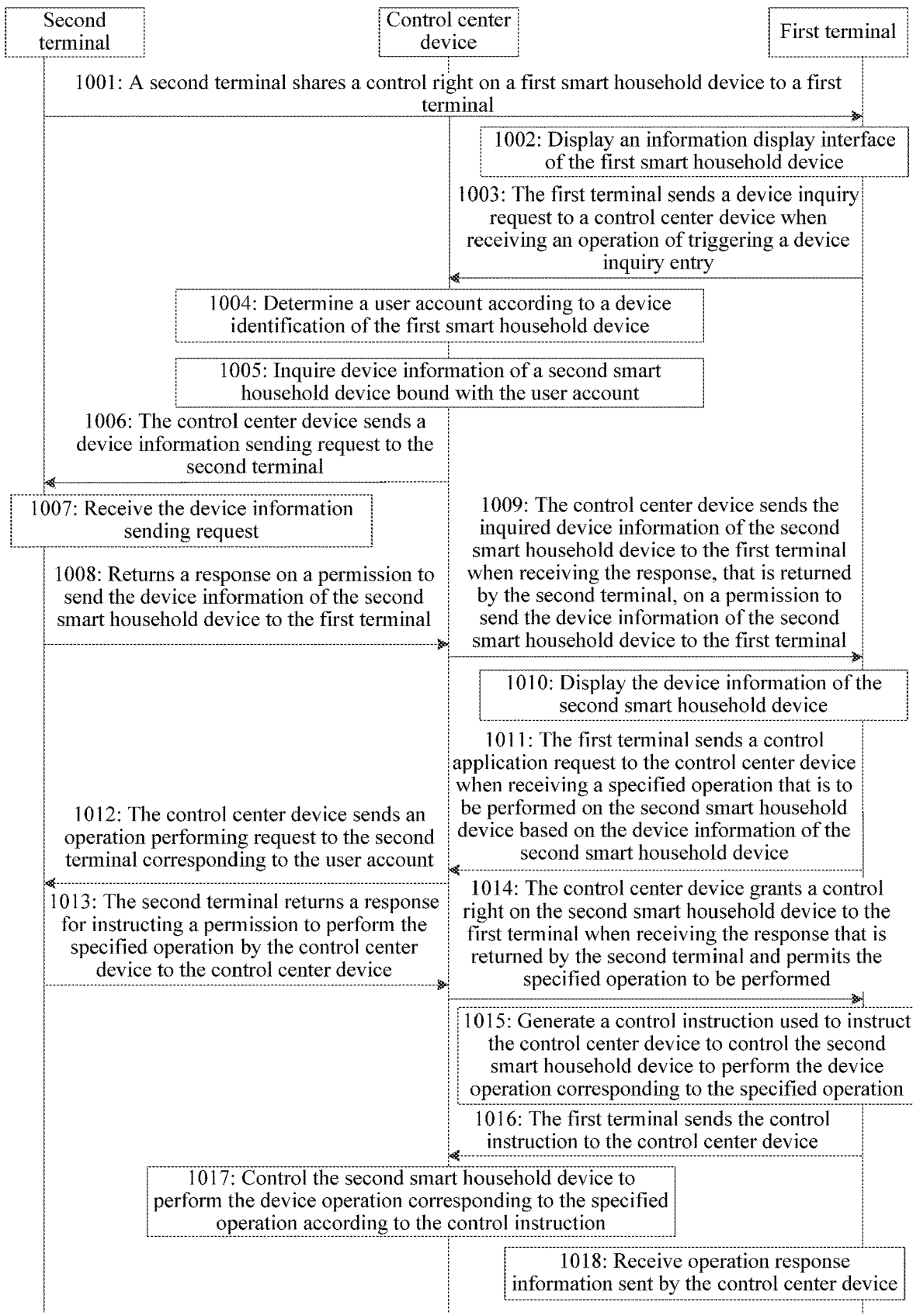
FIG. 10A is a flow chart of a device control method shown according to an exemplary embodiment.

FIG. 10A is a flow chart of a device control method shown according to an exemplary embodiment. The method may be applied to the system as shown in FIG. 8. As shown in FIG. 10A, the device control method may include the following steps:

Step 1001: A second terminal shares a control right on a first smart household device to a first terminal.

In a smart household system, the second terminal is a user terminal of an administrator, and has control rights on smart household devices in the smart household system, and the smart household devices include the first smart household device.

The second terminal may share the control right on the first smart household device to the first terminal. When the first terminal obtains the control right on the first smart household device, if the first smart household device is an independent smart household device, the first terminal obtains the control right on the smart household device; and if the first smart household device is a gateway device and is bound with a plurality of third smart household devices, the first terminal will not only obtain the control right on the first smart household device, but also obtain control rights on the third smart household devices bound to the gateway device.

For example, referring to FIG. 8, in the smart household system, the second terminal 820 has a control right on the first smart household device 810; and after the second terminal 820 shares the control right on the first smart household device 810 to the first terminal 821 of a friend, since the first smart household device 810 is connected and bound with the third smart household device 812, the first terminal 821 of the friend also obtains the control right on the third smart household device 812.

Step 1002: The first terminal displays an information display interface of the first smart household device.

The information display interface of the foregoing first smart household device includes a device inquiry entry, the device inquiry entry is used for providing a user with an entry for inquiring other smart household devices, and the other smart household devices include the second smart household device. The second smart household device and the first smart household device are bound to a same account number.

Figure 11:
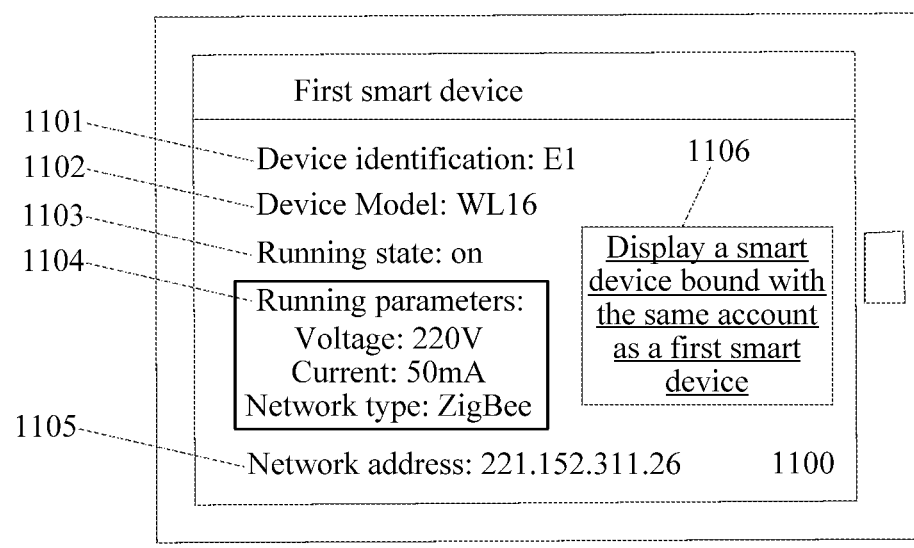
FIG. 11 is a schematic diagram of an information display interface provided based on the exemplary embodiment as shown in FIG. 10A.

Referring to FIG. 11 in combination. FIG. 11 is a schematic diagram of an information display interface provided based on the exemplary embodiment as shown in FIG. 10A. The information display interface is controlled by a first terminal to perform display, and may be displayed in a screen equipped in the first terminal or in a projection screen or other display device controlled by the first terminal.

In FIG. 11, the information display interface 1100 displays device information of a first smart household device, wherein the information display interface 1100 may be a visual operation interface as shown in FIG. 11, and may also be a dialog box (not shown). The information display interface 1100 displays all information of the first smart household device, such as a device identification 1101, a device model 1102, a running state 1103, a running parameter 1104 and a network address 1105 of the first smart household device. Besides, the information display interface 1100 also displays a device inquiry entry 1106, wherein the device inquiry entry 1106 is used for inquiring information of the other smart household devices that are bound to a same user account number as the first smart household device.

Step 1003: A first terminal sends a device inquiry request to a control center device when receiving an operation of triggering the device inquiry entry.

When a user clicks the device inquiry entry, the first terminal receives an operation of triggering the device inquiry entry and sends the device inquiry request to the control center device, wherein the device inquiry request includes the device identification of the first smart household device.

The device identification of the first smart household device may be an identification that uniquely marks a device within a device range where services may be provided by the control center device, such as an MAC (Media Access Control) address, an IPv6 (Internet Protocol Version 6) address, a local area network address or the like of the device.

TABLE 1

| Device Name | Device identification 1 | Device identification 2 | Device identification 3 |
| --- | --- | --- | --- |
| First Smart Household Device | MAC address 44-45-53-54-00-00 | IPv6 address FFED::BA98:3210:4562 | Local area network address 192.168.1.77 |

Refer to Table 1. Table 1 shows three possibly used device identifications of the first smart household device and corresponding character string forms for specific implementation, wherein the FFED::BA98:3210:4562 in the IPv6 address is in a compressed form, and a complete form of the code is FFED:0:0:0:0:BA98:3210:4562. It should be noted that the device identifications in Table 1 are only for the purpose of illustration herein, and do not refer to a certain specific device in the real world.

Correspondingly, the control center device receives a device inquiry request sent by the first terminal.

Step 1004: The control center device determines a user account number according to the device identifications of the first smart household device.

The user account number is an account number that is bound with the second terminal or logs in the second terminal, and the second terminal binds a plurality of smart household devices, including the first smart household device, to the user account number of the second terminal, thereby implementing control on the plurality of smart household devices.

The control center device searches out a corresponding user account number bound with the first smart household device in a corresponding relationship table stored in the control center device according to the device identification of the first smart household device. The user account number may be an administrator account number of the user in a system composed of smart household devices, or a social media account number, a corporate member account number, a bank card account number or the like. Table 2 is a corresponding relationship table of terminals, user account numbers and smart household devices. In Table 2, the first terminal is a user terminal of the shared user in the smart household system of the exemplary embodiment, and the second terminal s a user terminal of a host in the exemplary embodiment.

TABLE 2

| User terminal | User account number | Smart Household Device | | |
|---|---|---|---|---|
| Second terminal | 001A | First smart household device | Second smart household device A | Second smart household device B |
| First terminal | 002D | . . . | . . . | . . . |

Step 1005: The control center device inquires device information of a second smart household device bound with the user account number.

Referring to Table 2, since the control center device stores corresponding relationship in Table 2, the control center device may obtain the corresponding user account number and other smart household devices corresponding to (bound with) the user account number after obtaining the identification of the first smart household device. There may be one or more second smart household devices.

For example, after inquiring that the second smart household devices bound with the user account number 001A are the second smart household device 1 and the second smart household device 2, the control center device obtains device information of both the second smart household device 1 and the second smart household device 2.

The device information of the second smart household device includes at least one of a device name, a device category, a device model, a running parameter and a network address of the device. Schematically, the device category may include sensing devices and response devices, wherein the sensing devices are various sensors, and the response devices are smart home appliances having executive capacity and the device terminal may include garage devices, living room devices, bedroom devices and the like. The running parameter may include at least one of a supported network type, an electric parameter and a working mode, and the network address includes at least one of a local area network address and an IP address.

Step 1006: The control center device sends a device information sending request to the second terminal.

The device information sending request is used for requesting a permission for the control center device to send the device information of the second smart household device to the second terminal from the user of the second terminal.

Step 1007: The second terminal receives the device information sending request.

The user (namely administrator) of the second terminal chooses to permit the request or reject the request after receiving the device information sending request sent by the control center device.

If the user of the second terminal agrees that the control center device sends the device information of the second smart household device to the first terminal, the user of the second terminal may choose to permit the request; and if the user of the second terminal disagrees that the control center device sends the device information of the second smart household device to the first terminal, the user of the second terminal may choose to reject the request.

Step 1008: The second terminal returns a response on a permission to send device information of the second smart household device to the first terminal.

After the user of the second terminal performs a permission operation or a rejection operation, the second terminal returns, to the control center device, the response on a permission or rejection to send the device information of the second smart household device to the first terminal.

Step 1009: The control center device sends the inquired device information of the second smart household device to the first terminal when receiving the response, that is returned by the second terminal and permits the device information of the second smart household device to be sent to the first terminal.

Correspondingly, the first terminal receives the device information of the second smart household device, which is inquired and returned by the control center device according to the device identification of the first smart household device.

Step 1010: The first terminal displays the device information of the second smart household device.

The first terminal may display the device information of the second smart household device in the interface or a display area corresponding to the device inquiry entry, so that the user using the first terminal may check the information of the second smart household device.

Schematically, the interface displaying the device information of the second smart household device may refer to the information display interface as shown in FIG. 4, and the device information of the second smart household device may include at least one of a device identification, a device model, a running state, a running parameter and a network address like the first smart household device in FIG. 4.

Step 1011: The first terminal sends a control application request to the control center device when receiving a specified operation that is to be performed on the second smart household device based on the device information of the second smart household device.

In the information display interface of the second smart household device provided by the first terminal, the user may determine an operation to be performed by the second smart household device under instruction according to the device information of the second smart household device.

Here, it should be noted that the first terminal may provide a control application button for applying for specified control on the second terminal, and when the control application button is triggered, the first terminal sends a control application request to the control center device.

The control application request includes: a request for obtaining a control right on the second smart household device, a request for controlling the second smart household device to perform a corresponding device operation, and a request for establishing an interworking relationship between the second smart household device and the first smart household device or establishing an interworking relationship between the second smart household device and the third smart household device, wherein the third smart household device is a smart household device bound under the first smart household device as a gateway device.

An interworking relationship refers to a relationship that one of two devices performs a specified operation when the other device satisfies specified conditions.

Correspondingly, the control center device receives the control application request sent by the first terminal.

Step 1012: The control center device sends an operation performing request to the second terminal corresponding to the user account number.

The operation performing request is used for requesting, from the user of the second terminal, a permission to perform the specified operation by the control center device.

Step 1013: The second terminal returns, to the control center device, a response for instructing a permission to perform the specified operation by the control center device.

Step 1014: The control center device grants the control right on the second smart household device to the first terminal when receiving the response that is returned by the second terminal and permits the specified operation to be performed.

Step 1015: The second terminal generates a control instruction used to instruct the control center device to control the second smart household device to perform the device operation corresponding to the specified operation.

Step 1016: The first terminal sends the control instruction to the control center device.

Step 1017: The control center device controls the second smart household device to perform the device operation corresponding to the specified operation according to the control instruction.

Step 1018: The first terminal receives operation response information sent by the control center device.

The operation respond information is used for instructing a result that the control center device performs the specified operation. For example, the second smart household device has performed the device operation corresponding to the specified operation according to the control instruction, or the second smart household device does not respond to the control instruction.

Figure 10B:
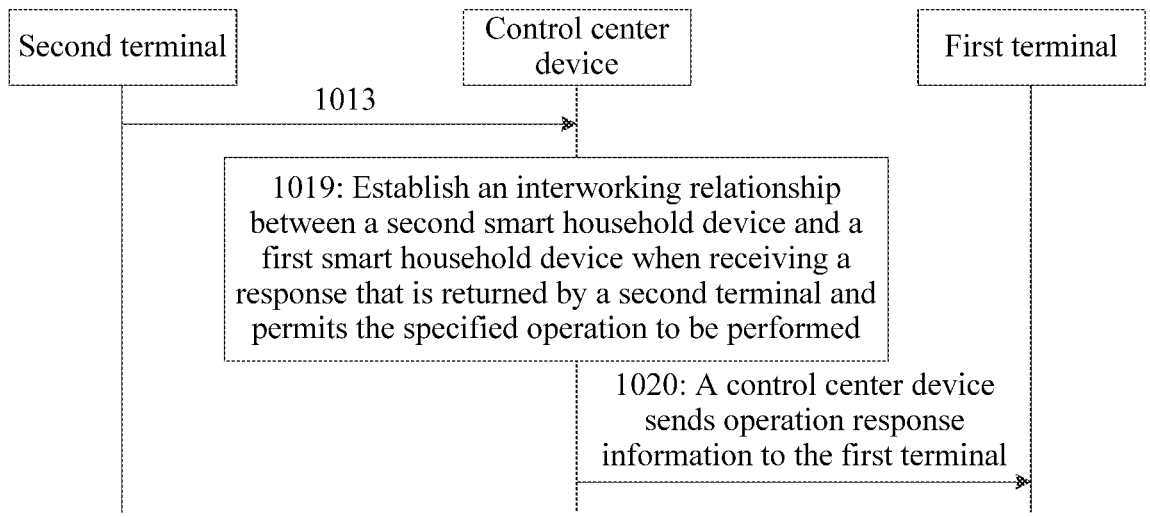
FIG. 10B is a flow chart of a device control method provided based on the exemplary embodiment as shown in FIG. 10A.

In another implementation manner of the exemplary embodiment, as shown in FIG. 10B, FIG. 10B is a flow chart of a device control method provided based on the exemplary embodiment as shown in FIG. 10A, and the combination of FIG. 10B and FIG. 10A becomes another implementation manner of the exemplary embodiment. When a specified operation is to establish an interworking relationship between a second smart household device and a first smart household device, step 1014 to step 1018 in FIG. 10A may be replaced with step 1019 and step 1020 in FIG. 10B.

Step 1019: A control center device establishes the interworking relationship between the second smart household device and the first smart household device when receiving a response that is returned by the second terminal and permits performing the specified operation.

The control center device establishes a relationship between an identification of the second smart household device and an identification of the first smart household device, sets that one of the smart household devices under a specified condition is a trigger condition of the relationship, and sets that the other smart household device performs a certain specified operation when the specified condition is triggered.

When the control center device receives that the trigger condition of the specified smart household device in the two smart household devices is triggered, the control center device sends an instruction to perform the specified operation to the other device, so as to control the other device to perform the specified operation.

Step 1020: The control center device sends operation response information to a first terminal.

Correspondingly, the first terminal receives the operation response information sent by the control center device.

The response information received by the first terminal is used to indicate that the control center device has successfully established the interworking relationship between the second smart household device and the first smart household device, or that the control center device has not successfully established the interworking relationship between the second smart household device and the first smart household device.

Figure 10C:
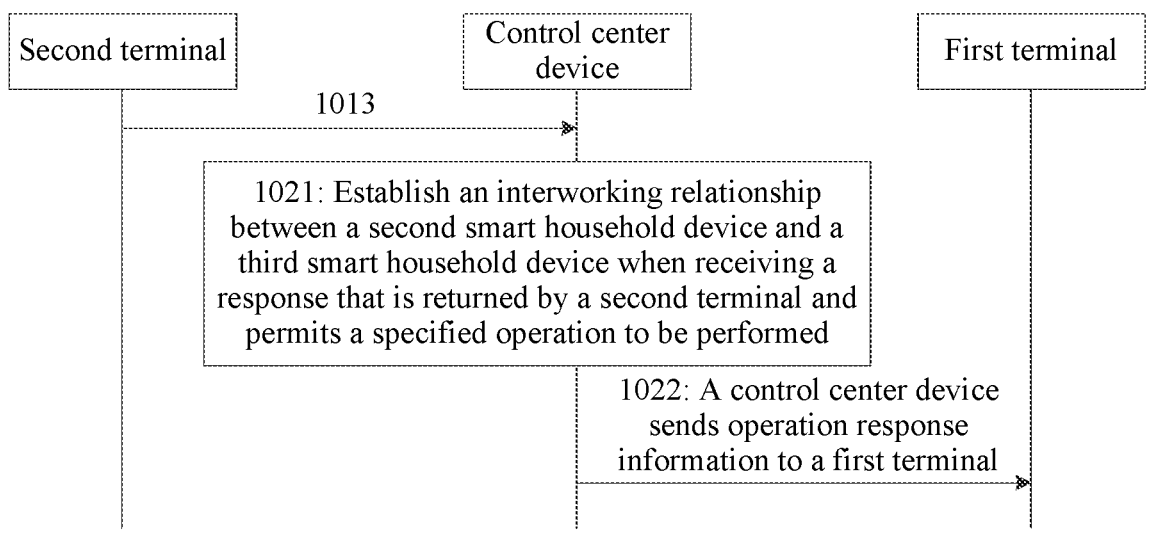
FIG. 10C is a flow chart of a device control method provided based on the exemplary embodiment as shown in FIG. 10A.

In another implementation manner of the exemplary embodiment, as shown in FIG. 10C, FIG. 10C is a flow chart of a device control method provided based on the exemplary embodiment as shown in FIG. 10A, and the combination of FIG. 10C and FIG. 10A becomes another implementation manner of the exemplary embodiment. When the specified operation is to establish an interworking relationship between a second smart household device and a third smart household device, step 1014 to step 1018 are replaced with step 1021 and step 1022. The third smart household device is a device that accesses the first smart household device used as a gateway device, and the foregoing interworking relationship refers to a relationship that one of the two devices performs a specified operation when the other device satisfies specified conditions.

Step S1021: A control center device establishes the interworking relationship between the second smart household device and the third smart household device when receiving a response that is returned by the second terminal and permits the specified operation to be performed.

Since the third smart household device is a smart household device that is connected and bound to the first smart household device used as the gateway device, the control center device may set a device identification of the first smart household device together with relevant information of the third smart household device when establishing a smart scenario between the second smart household device and the third smart household device. For example, when the third smart household device is used as a response device of the interworking relationship, the control center device may set the operation to be performed by the third smart household device together with the device identification of the first smart household device; and thus, the control center device firstly sends an instruction for instructing the third smart household device to perform the specified operation to the first smart household device according to the identification of the first smart household device to the first smart household device, and then the first smart household device sends the instruction for instructing the third smart household device to perform the specified operation to the third smart household device according to the device identification of the third smart household device carried in the instruction. When the control center device finishes setting a trigger condition and a response condition of the interworking relationship, the establishment of the interworking relationship is completed.

Step S1022: The control center device sends operation response information to a first terminal.

Correspondingly, the first terminal receives the operation response information sent by the control center device.

The response information received by the first terminal is used for indicating that the control center device has successfully established the interworking relationship between the third smart household device and the second smart household device, or that the control center device has not successfully established the interworking relationship between the third smart household device and the second smart household device.

In still another implementation manner of the exemplary embodiment, when the specified operation is to control the second smart household device to perform a device operation corresponding to the specified operation, the control center device controls the second smart household device to perform the device operation corresponding to the specified operation when receiving a response that is returned by the second terminal and permits the specified operation to be performed.

For example, giving an example that the second terminal is a mobile phone of a user A, the first terminal is a mobile phone of a user B, the first smart household device is a wireless access point (the wireless access point is positioned in a living room of a house of the user A, and the wireless access point is bound with an air conditioner and a water heater) bound with a user account number of the user A, and the second smart household device is a garage camera bound with the user account number of the user A, an exemplary embodiment is introduced.

Figure 12:
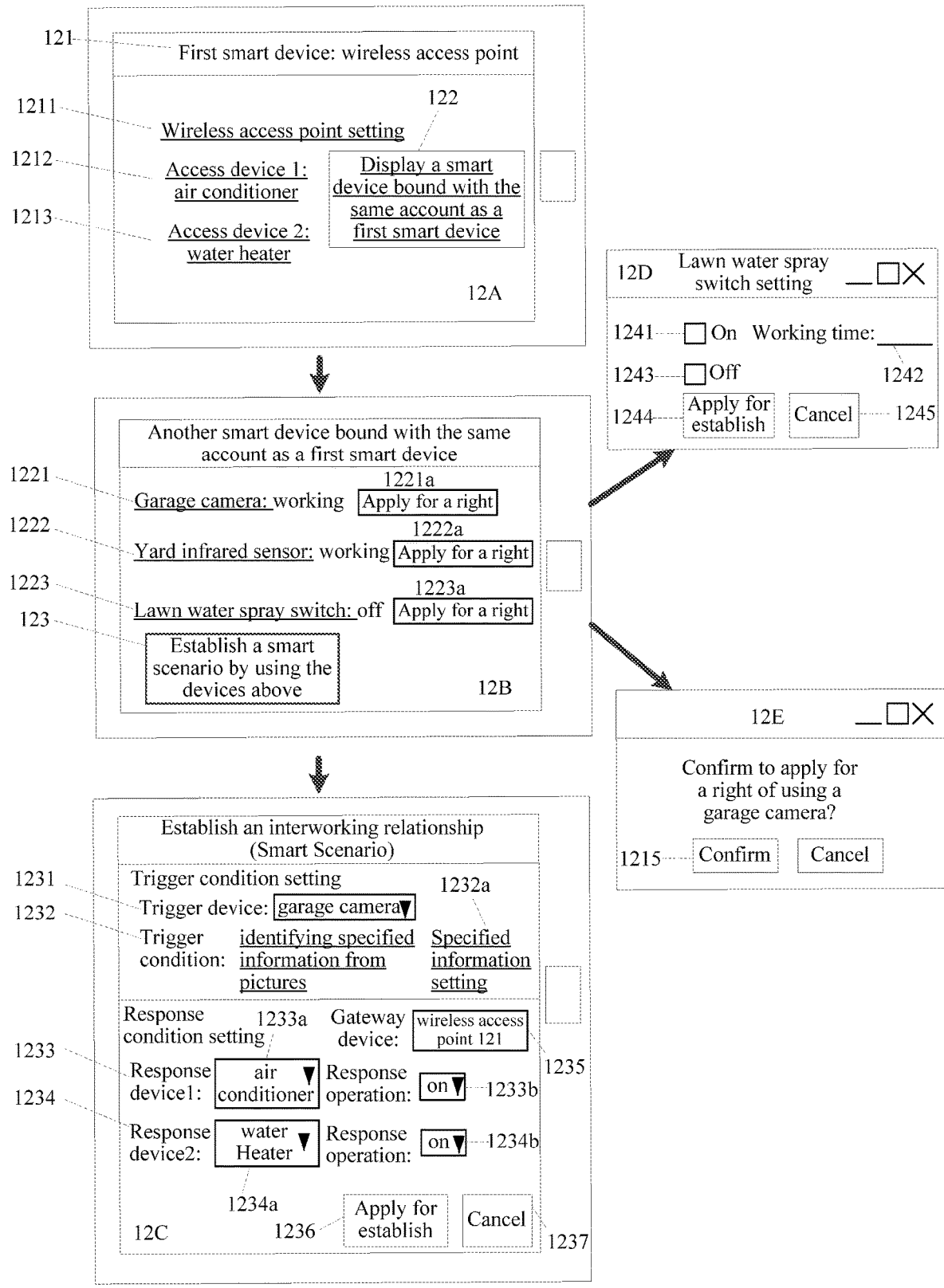
FIG. 12 is a schematic diagram of a device control process provided based on the exemplary embodiment as shown in FIG. 10A.

The user A shares a control right on the wireless access point in the living room to the user B by using the mobile phone of the user A, the mobile phone of the user B receives and has the control right on the wireless access point, and the mobile phone of the user B may display a shared interface. As shown in FIG. 12, FIG. 12 is a schematic diagram of a device control process provided based on the exemplary embodiment as shown in FIG. 10A, an information display interface 12A displays a setting button. 1211 of the wireless access point 121, the air conditioner 1212 and the water heater 1213 bound with the wireless access point, and an inquiry entry 122 of other smart household devices bound with a same user account number as the wireless access point 121; when the user B clicks the inquiry entry 122 for the other smart household devices, the mobile phone of the user B will obtain information of the other smart household devices bound with the user account number from the control center device according to the user account number of the user A, and display the information of the other smart household devices; as shown in an interface 12B, the other smart household devices bound with the user account number of the user A are the garage camera 1221, a yard infrared sensor 1222 and a lawn water spray switch 1223, which respectively correspond to an right obtaining button 1221a, an right obtaining 1222a and an right obtaining button 1223a.

At this time, the user B may apply for obtaining the control right on the garage camera 1221, the yard infrared sensor 1222 and the lawn spray switch 1223; and the user B may control the corresponding device to work at any time after obtaining the right on the corresponding device. Or, the user B may also apply for a one-off control request, for example, apply for switching on the lawn water spray switch for 15 minutes. Or, the user B may also establish an interworking relationship (smart scenario) including at least one of the garage camera 1:221, the yard infrared sensor 1222 and the lawn water spray switch 1223.

In some exemplary embodiments, when the user B wants to perform one-off control on the lawn control switch 1223, the user B may click the button 1223a of the lawn control switch in the interface 12B; at this time, the first terminal will display a dialog box 1:2D, and the user may check an On option 1241 or an Off option 1243; and after the user checks the On option 1241, the user must fill in time duration information 1242 with corresponding time duration of keeping a working state. For example, if the user B wants to water a lawn for 15 minutes, the user B checks the On option 1241 and fills in the duration information 1242 with 15 minutes (working time duration that the user wants to keep). Then, after the user B clicks an application button 1244, the first terminal will send the application to the control center device, and the control center device will forward the application to the second terminal; after the user A approves the application by using the second terminal, the control center device will receive a response returned by the second terminal and send an on instruction to the lawn water spray switch, in the meanwhile, start a timer, and send an off instruction to the lawn water spray switch after 15 minutes. In some exemplary embodiments, the instruction sent by the control center device to the lawn spray switch indicates that the switch keeps an on state for 15 minutes; and after the lawn water spray switch is turned on, the timer in the lawn water spray switch is started, and the water spray switch is turned off after 15 minutes. In addition, the user may click a cancel button 1245 to cancel the setting on the lawn water spray switch.

In some exemplary embodiments, if the user wants to obtain the control right on the garage camera 1221, the user B may click an right application button 1221a in the interface 12B; after the right application button 1:221a is clicked, the first terminal will display a dialog box 12E and prompt the user B to confirm to apply for a use right on the garage camera; when the user B chooses a confirmation button 1251, the first terminal sends an application to the control center device, the control center device forwards the application to the second terminal, the second terminal returns a response that approves the application to the control center device after the user A approves the application, and the control center device opens the right of using the garage camera 1221 by the first terminal according to the response, and returns a prompt to the first terminal to prompt that the first terminal has obtained the control right on the garage camera.

In still other exemplary embodiments, if the user wants to establish an interworking relationship between the garage camera 1221 and an access devices (air conditioner 1212) as well as an access device (water heater 1213) bound to the wireless access point, the user B may click a button 123 in the interface 12B, then the first terminal will display an interface 12C, and the user B may choose the garage camera in a drop-down box of a trigger device 1231, wherein all candidate devices in the drop-down box are other smart household devices bound with a same account number as the first smart household device. Afterwards, the user B may set a gateway device as a wireless access point 121 in response condition setting; when the user B clicks drop-down menus in a response device. 1233 and a response device 1234, the second terminal will display the air conditioner and the water heater bound under the wireless access point 121 in a drop-down menus, and the user B may respectively set response operations of the air conditioner and the water heater in a drop-down menu 1233b and a drop-down menu 1234b; and after finishing the setting, the user B may click an Apply For Establish button 1236, or the user B may click a Cancel button 1237 if the user B wants to give up establishing the interworking relationship.

After the user B clicks the Apply For Establish button 1236, the first terminal will send a request for establishing the interworking relationship to the control center device, and the control center device forwards the request for establishment to the first terminal; and after the first terminal permits the request for establishment, the control center device will establish and maintain the interworking relationship, and instruct the corresponding response device to perform the response operation when a trigger condition of the trigger device is satisfied.

Figure 13:
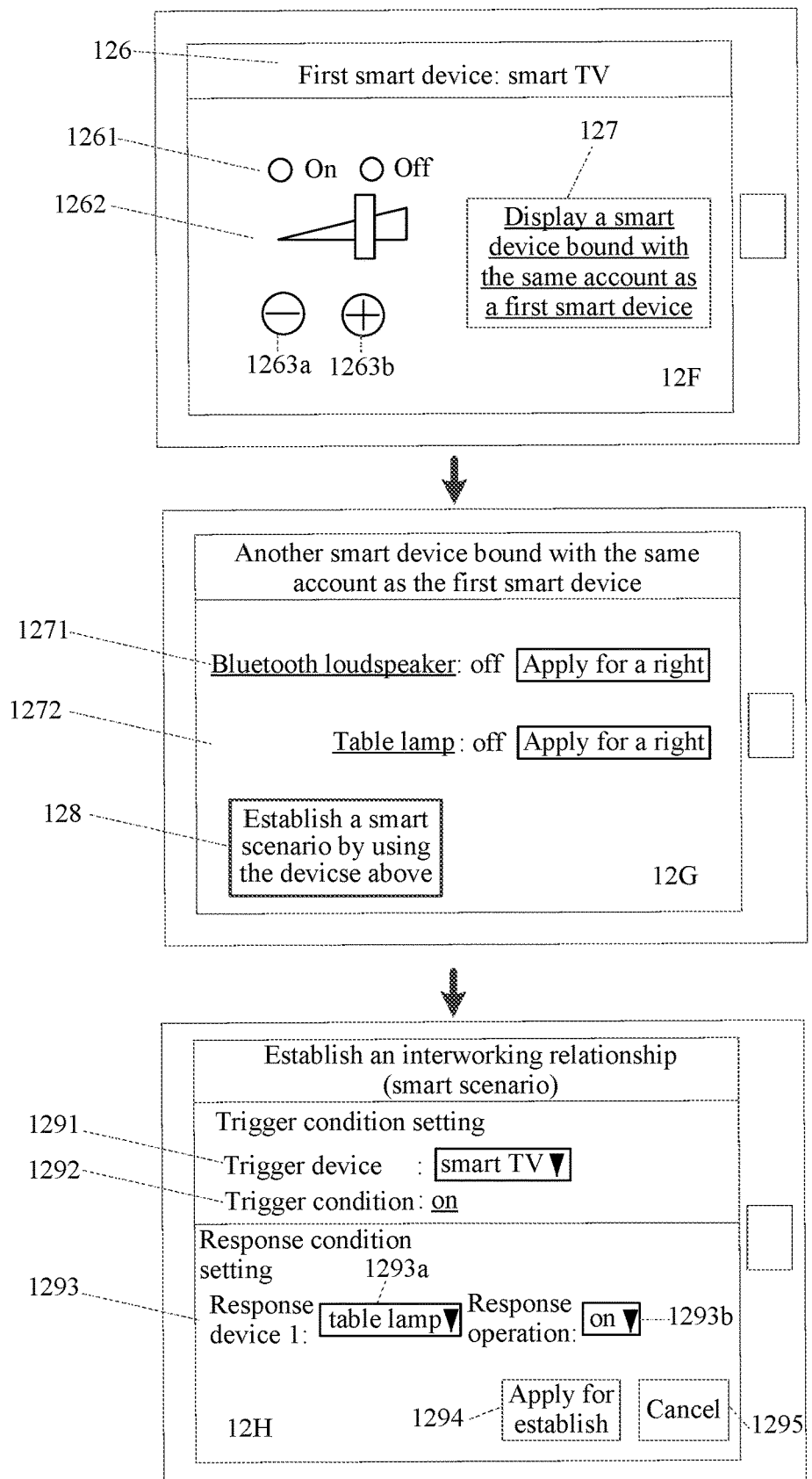
FIG. 13 is a schematic diagram of a device control process provided based on the exemplary embodiment as shown in FIG. 10A.

In yet other exemplary embodiments, please refer to FIG. 13. FIG. 13 is a schematic diagram of a device control process provided based on the exemplary embodiment as shown in FIG. 10A. In FIG. 13, if a first smart household device is a non-network access device, such as a smart TV, a first terminal will display an interface 12F after the user B obtains a control right on the smart TV; and when the first smart household device is a smart TV 126, the user B may control an on/off state of the smart TV by using a switch 1261, control the volume of the smart TV by using a volume slider 1262, and select TV programs by using a program selection button 1263a and a program selection button 1263b. In addition, the user B will inquire smart household devices bound with a same user account number as the smart TV 126 by using a device inquiry entry 127. When the user B clicks the device inquiry entry 127, the first terminal will display an interface 12G that displays a Bluetooth loudspeaker 1271 and a table lamp 1272 that are bound with a same account number as the smart TV, and the user B may click a button 128 to establish an interworking relationship between the smart TV 126 and the devices bound with the same account number. After the user B clicks the button 128, the first terminal displays an interface 12H. In the interface 12H, the user B sets a trigger device 1291 as the smart TV and set a trigger condition 1292 as the turning on of the smart TV in trigger condition setting; and in response condition setting, the user B selects the table lamp in a drop-down menu 1293a in response device 1293 setting, and selects On in a response operation 1293b, and then clicks an Apply For Establish button 1294, or clicks a Cancel button 1295 to cancel the establishment of the interworking relationship if the user B does not want to establish the interworking relationship. Since the smart TV used as the first smart household device is connected with a control center device directly through a network instead of a gateway device, the user B does not need to choose to set the gateway device when establishing the interworking relationship.

After the user B finishes various settings in the interface 12H and clicks the Apply For Establish button 1234, the control center device receives the interworking relationship establishment request sent by the first terminal and forwards the request to a second terminal; after the second terminal approves the request, the control center device will establish and maintain the interworking relationship, and will send an On instruction to the table lamp after it is detected that the smart TV is turned on.

Accordingly, according to the device control method provided by the exemplary embodiment, a first terminal shares a control right of a first smart household device to a second terminal, the first terminal displays an information display interface of the first smart household device, the first terminal sends a device inquiry request to the control center device when receiving a trigger operation on a device inquiry entry, a control center device determines a user account number according to a device identification of the first smart household device, the control center device inquires device information of a second smart household device bound with the user account number, the control center device sends a device information sending request to the second terminal, the second terminal receives the device information sending request, the second terminal returns a response on a permission to send the device information of the second smart household device to the first terminal, the control center device sends the inquired device information of the second smart household device to the first terminal when receiving the response which is returned by the second terminal and permits the device information of the second smart household device to the first terminal to be sent, the first terminal displays the device information of the second smart household device, the first terminal sends a control application request to the control center device when receiving a specified operation which is to be performed on the second smart household device based on the device information of the second smart household device, the control center device sends an operation performing request to the second terminal corresponding to the user account number, the second terminal returns, to the control center device, a response for indicating whether to permit the control center device to perform the specified operation, and the first terminal receives the operation response information sent by the control center device, so that the first terminal, when having no control right on the second smart household device, may apply, to the control center device, for obtaining the device information of the second smart household device from the control center device, send the request, that is generated according to the device information of the second smart household device and specifies the second smart household device to perform the specified operation, and thus, implement the control on the second smart household device after the request is permitted, thereby achieving the effect that a device sharing process may be actively initiated by the second terminal of an owner user, and may be actively initiated also by the first terminal of a shared user.

In addition, since the first terminal provides the information display interface for displaying the first smart household device, and provides the device inquiry entry in the interface, the first terminal may obtain the device information of the second smart household device by using the device inquiry entry on the basis of knowing the information of the first smart household device, master relevant information of the smart household device to be controlled before controlling the second smart household device, and provide the entry for the second smart household device.

In addition, since the specified operation includes the control on the second smart household device to perform the device operation corresponding to the specified operation, the first terminal may also achieve the effect of performing the device operation corresponding to the specified operation on the second smart household device when not obtaining the control right on the second smart household device, thereby achieving the effect of performing flexible control on a use right on the second smart household device according to frequency granularity or specific right granularity.

In addition, since the specified operation also includes the establishment of the interworking relationship between the second smart household device and the first smart household device, the first terminal may perform the corresponding interworking control on the smart household devices under the specified condition under the condition of actively sending a control request to the other smart household devices bound to the user account number corresponding to the smart household device that already has the control right, thereby enriching control scenarios of the smart household devices.

The following introduces an apparatus exemplary embodiment, which may be used to perform the method exemplary embodiment. For details that are not disclosed in the apparatus exemplary embodiment, please refer to the method exemplary embodiment.

Figure 14:
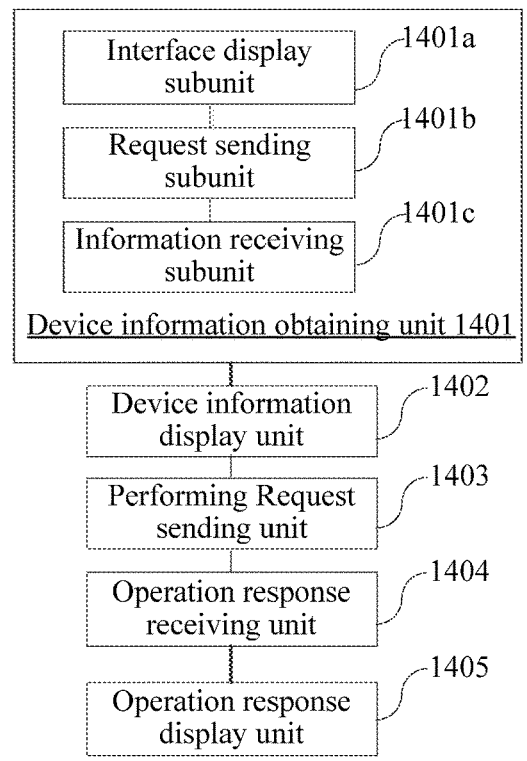
FIG. 14 is a structure block diagram of a device control apparatus provide an exemplary embodiment.

Please refer to FIG. 14 that shows a structure block diagram of a device control apparatus provided by an exemplary embodiment. The device control apparatus may, implement the whole or part of the first terminal 821 in the smart household system architecture as shown in FIG. 8 by using a hardware circuit or by using a combination of hardware and software. The device control apparatus may include a device information obtaining unit 1401, a device information display unit 1402 and a performing request sending unit 1403.

The device information acquisition unit 1401 is configured to obtain device information of a second smart household device from a control center device, wherein the second smart household device is a smart household device bound with a same user account number as a first smart household device.

The device information display unit 1402 is configured to display the device information of the second smart household device.

The performing request sending unit 1403 is configured to send a control application request to the control center device when receiving a specified operation that is to be performed on the second smart household device based on the device information of the second smart household device, wherein the control application request is used for instructing the control center device to request a permission to perform the specified operation from a second terminal corresponding to the user account number, and performing the specified operation when receiving a response that is returned by the second terminal and permits the specified operation to be performed.

In some exemplary embodiments, the device information obtaining unit 1401 includes:

an interface display subunit 1401a, configured to display an information display interface of the first smart household device, wherein the information display, interface of the first smart household device includes a device inquiry entry;

a request sending subunit 1401b, configured to transmitting a device inquiry request to the control center device when receiving a trigger operation on the device inquiry entry, wherein the device inquiry request includes a device identification of the first smart household device; and an information receiving 1401c, configured to receive the device information of the second smart household device, that is inquired and returned by the control center device according to the device identification of the first smart household device.

In some exemplary embodiments, the apparatus also includes:

an operation response receiving unit 1404, configured to receive operation response information sent by the control center device, wherein the operation response information is used for indicating a result that the control center device performs the specified operation; and an operation response display unit 1405, configured to display the operation response information corresponding to the device information of the second smart household device.

In some exemplary embodiments, the specified operation includes: a device operation of granting a control right on the second smart household device to the first terminal, or controlling the second smart household device to perform the device operation corresponding to the specified operation.

In some exemplary embodiments, the specified operation includes: establishing an interworking relationship between the second smart household device and the first smart household device, or establishing an interworking relationship between the second smart household device and a third smart household device when the first smart household device is a gateway device and there is the third smart household device that accesses the network device, wherein the interworking relationship refers to a relationship that one of two devices performs a specified operation when the other device satisfies specified conditions.

Accordingly, according to the device control apparatus provided by the exemplary embodiment, by obtaining device information of a second smart household device (the second smart household device being a smart household device bound with a same user account number as a first smart household device) from a control center device, displaying the device information of the second smart household device, and sending a control application request to the control center device when receiving a specified operation that is performed on the second smart household device based on the device information of the second smart household device, even if a first terminal has not shared a control right on the second smart household device, the first terminal may also actively send a control request for controlling the second smart household device since the first smart household device and the second smart household device are bound with the same user account number; and the effect that a device sharing process may be actively initiated by the second terminal of an owner user, and may be actively initiated also by the first terminal of a shared user is achieved.

Figure 15:
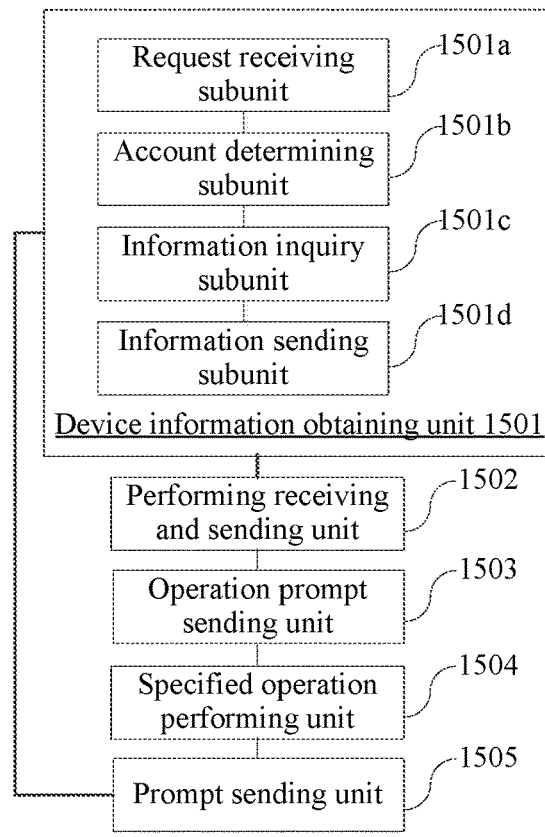
FIG. 15 is a structure block diagram of a device control apparatus provided by another exemplary embodiment.

Please refer to FIG. 15 that shows a structure block diagram of a device control apparatus provided by another exemplary embodiment. The device control apparatus may implement the whole or part of the control center device 830 in the system architecture as shown in FIG. 8 by using a hardware circuit or by using a combination of hardware and software. The device control apparatus may include: a device information providing unit 1501, a performing receiving and sending unit 1502, an operation prompt sending unit 1503 and a specified operation performing unit 1504.

The device information providing unit 1501 is configured to provide device information of a second smart household device to a first terminal, wherein the first terminal shares a control right on a first smart household device, and the first smart household device and the second smart household device are bound to a same user account number.

The performing receiving and sending unit 1502 is configured to receive a control application request sent by the first terminal, wherein the control application request is a request sent by the first terminal when the first terminal receives a specified operation that is to be performed on the second smart household device based on the device information of the second smart household device.

The operation prompt sending unit 1503 is configured to request a permission to perform the specified operation from a second terminal corresponding to the user account number.

The specified operation performing unit 1504 is configured to perform the specified operation when receiving a response that is returned by the second terminal and permits the specified operation to be performed.

In some exemplary embodiments, the device information providing unit 1501 includes:

a request receiving subunit 1501*a*, configured to receive a device inquiry request sent by the first terminal, wherein the device inquiry request includes a device identification of the first smart household device;

an account number determining subunit 1501*b*, configured to determine the user account number according to the device identification of the first smart household device;

an information inquiry subunit 1501*c*, configured to inquire the device information of the second smart household device bound with the user account number; and an information sending subunit 1501*d*, configured to send the inquired device information of the second smart household device to the first terminal.

In some exemplary embodiments, the apparatus also includes:

a prompt sending unit 1505, configured to send a device information sending request to the second terminal before providing the device information of the second smart household device to the first terminal, wherein the device information sending request is used for requesting a permission to send the device information of the second smart household device to the second terminal.

The device information providing unit 1501 is specifically configured to provide the device information of the second smart household device to the first terminal when receiving the response that is returned by the second terminal and permits the device information of the second smart household device to the first terminal to be sent.

In some exemplary embodiments, the specified operation includes:

granting a control right on the second smart, household device to the first terminal, or controlling the second smart household device to perform the device operation corresponding to the specified operation.

In some exemplary embodiments, the specified operation includes:

establishing an interworking relationship between the second smart, household device and the first smart household device, or establishing an interworking relationship between the second smart household device and a third smart household device when the first smart household device is the gateway device and there is the third smart household device that accesses the network device, wherein the interworking relationship refers to a relationship that one of two devices performs a specified operation when the other device satisfies specified conditions.

Accordingly, according to the device control apparatus provided by exemplary embodiment, by providing device information of a second smart household device to a first terminal, receiving a control application request sent by the first terminal, sending the operation prompt to the second terminal corresponding to the user account number, and performing a specified operation when receiving a response that is returned by a second terminal and permits the specified operation to be performed, the first terminal may obtain the device information of the second smart household device under the condition of having no control right on the second smart household device and send the control application request of the second smart household device on such a basis, and a control center device performs the control application request when the second terminal permits the performing request, so that even if the first terminal has not shared the control right on the second smart household device, the first terminal may also actively send the control request for controlling the second smart household device since the first smart household device and the second smart household device are bound with the same user account number; and the effect that a device sharing process may be actively initiated by the second terminal of an owner user, and may be actively initiated also by the first terminal of a shared user is achieved.

The exemplary embodiment also provides a device control system. The device control system may include a first terminal, a second terminal, a control center device, a first smart household device and a second smart household device.

The first terminal is configured to perform all or parts of the steps shown in FIG. 9, or perform all or parts of the steps performed by the first terminal in FIG. 10B or FIG. 10C.

The second terminal is configured to perform all or parts of the steps shown in FIG. 9, or perform all or parts of the steps performed by the second terminal in FIG. 10A, FIG. 10B or FIG. 10C.

The control center device is configured to perform all or parts of the steps shown in FIG. 9, or perform all or parts of the steps performed by the second terminal in FIG. 10A, FIG. 10B or FIG. 10C.

It should be noted that the above functional modules are only described for exemplary purposes for the device control apparatus provided by the foregoing exemplary embodiment. In actual application, the functions may be allocated to different functional modules to be achieved according to needs, namely the internal structure of the apparatus is divided to different functional modules to complete all or some of the above described functions. In addition, the device control apparatus and device control method exemplary embodiments provided by the foregoing exemplary embodiments are based on a same concept. For the specific implementation process thereof, refer to the method exemplary embodiments, and the details are not described herein again.

Figure 16:
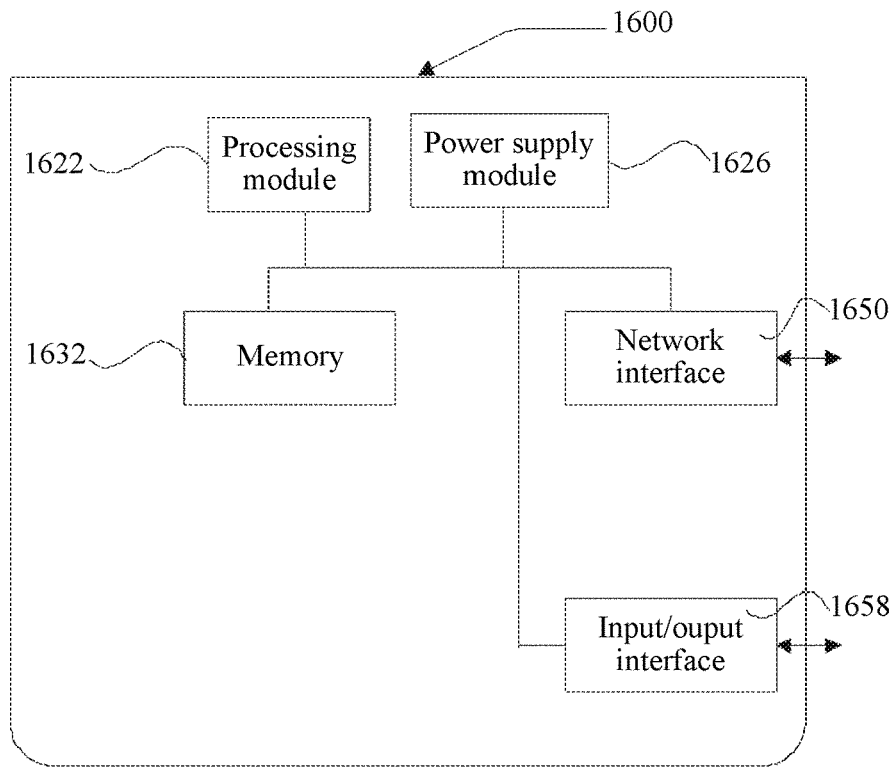
FIG. 16 is a structure schematic diagram of a device shown according to an exemplary embodiment.

FIG. 16 is a structure schematic diagram of a device 1600 shown according to an exemplary embodiment. For example, the device 1600 may be a gateway. Referring to FIG. 16, the apparatus 1600 includes a processing component 1622, and further includes one or more processors and a memory resource which is represented by a memory 1632, and is configured to store instructions that may be executed by the processing component 1622, for example, one or more programs. Besides, the one or more programs are configured to be executed by the one or more processors to implement the device control method that is performed by a primary gateway, secondary gateways, terminals, a control center device or the like.

The apparatus 1600 may also include a power supply module 1628 that is configured to perform power management on the apparatus 1600, a wired or wireless network interface 1650 that is configured to connect the apparatus 1600 to a network, and an input/output (I/O) interface 1658. The apparatus 1600 may operate based on an operating system stored in the memory 1632, for example, Windows Server™, Mac OS X™, Unix™, Linux™, FreeB SD™ or the like.

Figure 17:
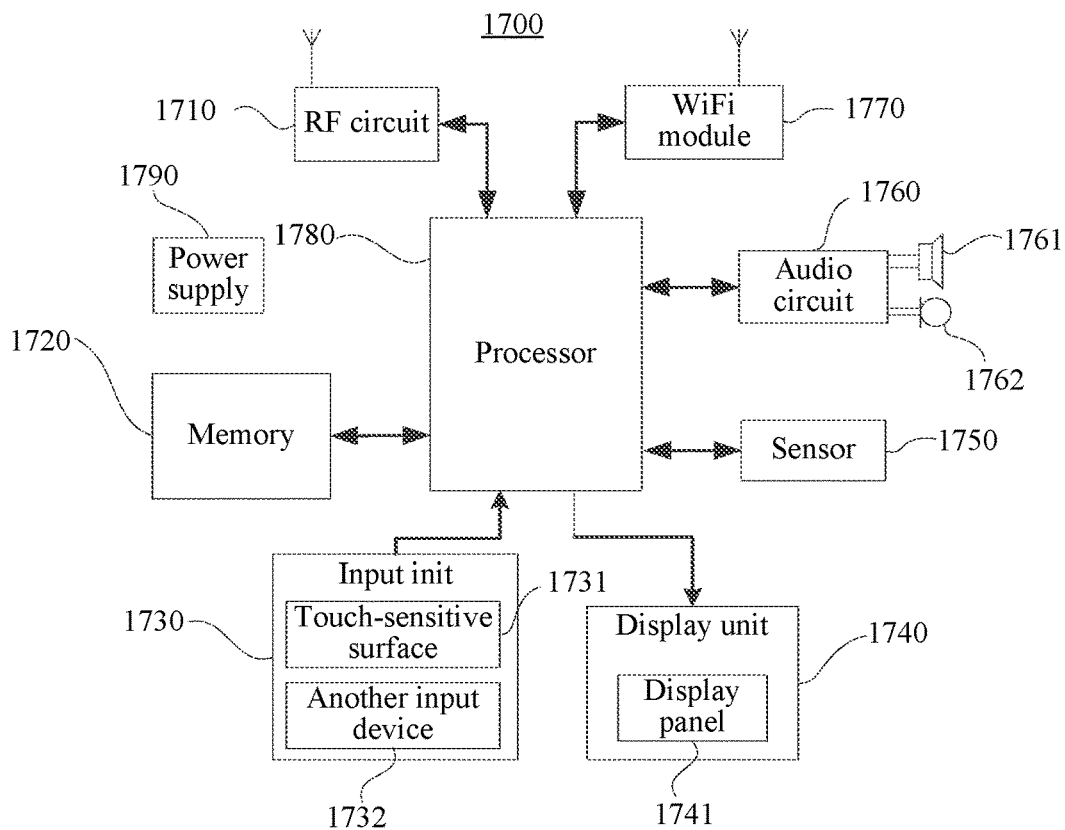
FIG. 17 is a structure schematic diagram of a device provided by an exemplary embodiment.

Please refer to FIG. 17 that shows a structure schematic diagram of a device 1700 provided by an exemplary embodiment. The device 1700 may be a first terminal 821 or a second terminal 820 in the system architecture as shown in FIG. 8. Specifically:

The device 1700 may include components such as an RF (Radio Frequency) circuit 1710, a memory 1720 including one or more than one computer readable storage media, an input unit 1730, a display unit 1740, a sensor 1750, an audio circuit 1760, a WiFi (wireless fidelity) unit 1770, a processor 1780 including one or more than one processing cores, and a power supply 190. A person skilled in the art may understand that the structure of the device shown in FIG. 17 does not constitute a limitation to the device, and the device may include more components or fewer components than those shown in the figure, or some components may be combined, or a different component deployment may be used.

The RF circuit 1710 may be configured to receive and send signals during an information receiving and sending process or a call process. Particularly, the RF circuit 1710 receives downlink information of a base station, then delivers the downlink information to the one or more processors 1780 for processing, and sends uplink-related data to the base station. Generally, the RF circuit includes, but is not limited to, an antenna, at least one amplifier, a tuner, one or more oscillators, a subscriber identity module (SIM) card, a transceiver, a coupler, a low noise amplifier (LNA), a duplexer and the like. In addition, the RF circuit 1710 may also communicate with a network and another device by wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS) and the like. The memory 1720 may be configured to store a software program and a module. The processor 1780 runs the software program and the module stored in the memory 1720, so as to implement various functional applications and data processing. The memory 1720 may mainly include a program storage area and a data storage area. The program storage area may store an operating system, an application program required by at least one function (such as a sound playback function, an image play function and the like), and the like; and the data storage area may store data (such as audio data, a phone book and the like) created according to use of the device 1700, and the like. In addition, the memory 1720 may include a high speed random access memory, and may also include a non-volatile memory, such as at least one magnetic disk storage device, a flash memory device or another volatile solid-state storage device. Correspondingly, the memory 1720 may further include a memory controller, so as to provide access of the processor 1780 and the input unit 1730 to the memory 1720.

The input unit 1730 may be configured to receive input digit or character information, and generate a keyboard, mouse, joystick, optical or track ball signal input related to user setting and function control. Specifically, the input unit 1730 may include a touch-sensitive surface 1731 and another input device 1732. The touch-sensitive surface 1731, also referred to as a touch screen or a touch panel, may collect a touch operation of a user on or near the touch-sensitive surface (such as an operation of the user on or near the touch-sensitive surface 1731 by using any suitable object or accessory, such as a finger or a stylus), and drive a corresponding connection apparatus according to a preset program. In some exemplary embodiments, the touch-sensitive surface 1'731 may include two parts: a touch detection apparatus and a touch controller. The touch detection apparatus detects a touch position of the user, detects a signal generated by the touch operation, and transfers the signal to the touch controller; and the touch controller receives touch information from the touch detection apparatus, converts the touch information into touch point coordinates, sends the touch point coordinates to the processor 1780, and moreover may receive and execute a command sent by the processor 1780. In addition, the touch-sensitive surface 1731 may be implemented by multiple types including a resistive type, a capacitive type, an infrared type, a surface sound wave type and the like. In addition to the touch-sensitive surface 1731, the input unit 1730 may further include the another input device 1732. Specifically, the another input device 1732 may include, but is not limited to, one or more of a physical keyboard, a functional key (such as a volume control key, a switch key and the like), a track ball, a mouse, a joystick and the like.

The display unit 1740 may be configured to display information input by the user or information provided for the user as well as various graphical user interfaces of the device 1700. The graphical user interfaces may be formed by a graph, a text, an icon, a video, and any combination thereof. The display unit 1740 may include a display panel 1741. In some exemplary embodiments, the display panel 1741 may be configured by using a liquid crystal display (LCD), an organic light-emitting diode (OLED), or the like. Further, the touch-sensitive surface 1731 may cover the display panel 1741. After detecting a touch operation on or near the touch-sensitive surface 1731, the touch-sensitive surface 1731 transfers the touch operation to the processor 1780, so as to determine a type of a touch event. Then, the processor 1780 provides a corresponding visual output on the display panel 1741 according to the type of the touch event. Although, in FIG. 17, the touch-sensitive surface 1731 and the display panel 1741 are used as two separate parts to implement input and output functions, in some exemplary embodiments, the touch-sensitive surface 1731 and the display panel 1741 may be integrated to implement the input and output functions.

The device 1700 may further include at least one sensor 1750, such as an optical sensor, a motion sensor and other sensors. Specifically, the optical sensor may include an ambient light sensor and a proximity sensor. The ambient light sensor may adjust luminance of the display panel 1741 according to brightness of ambient light. The proximity sensor may switch off the display panel 1741 and/or backlight when the device 1700 is moved to the ear. As one type of the motion sensor, a gravity acceleration sensor may detect magnitude of acceleration in various directions (generally on three axes), may detect magnitude and a direction of gravity when static, and may be applied to an application that recognizes the attitude of a mobile phone (for example, switching between landscape orientation and portrait orientation, a related game and magnetometer attitude calibration), a function related to vibration recognition (such as a pedometer and a knock), and the like. Other sensors, such as a gyroscope, a barometer, a hygrometer, a thermometer, an infrared sensor and the like, that may be configured in the device 1700, are not further described herein.

The audio circuit 1760, a loudspeaker 1721, and a microphone 1722 may provide audio interfaces between the user and the device 1700. The audio circuit 1760 may convert received audio data into an electric signal and transmit the electric signal to the loudspeaker 1721, and the loudspeaker 1721 converts the electric signal into a sound signal for output; and on the other hand, the microphone 1722 converts a collected sound signal into an electric signal, the audio circuit 1760 receives the electric signal and converts the electric signal into audio data, and outputs the audio data to the processor 1780 for processing, and then, the processor 1780 sends the audio data to another device by using the RF circuit 1710, or outputs the audio data to the memory 1720 for further processing. The audio circuit 1760 may further include an earplug jack, so as to provide communication between a peripheral earphone and the device 1700.

WiFi is a short distance wireless transmission technology. The device 1700 may help, by using the WiFi module 1770, the user to receive and send e-mails, browse a webpage, access streaming media, and the like, which provides wireless broadband Internet access for the user. Although FIG. 17 shows the WiFi module 1770, it may be understood that the WiFi module is not a necessary component of the device 1700, and when required, the WiFi module may be omitted as long as the scope of the essence of the present disclosure is not changed.

The processor 1780 is a control center of the device 1700, and is connected to various parts of the whole device by using various interfaces and lines. By running or executing the software program and/or the module stored in the memory 1720, and invoking data stored in the memory 1720, the processor 1780 performs various functions of the device 1700 and processes data, thereby performing overall monitoring on the device. In some exemplary embodiments, the processor 1780 may include one or more processing cores; and in some exemplary embodiments, the processor 1780 may integrate an application processor and a modem, wherein the application processor mainly processes an operating system, a user interface, an application program and the like, and the modem mainly processes wireless communication. It may be understood that the foregoing modem may also not be integrated into the processor 1780.

The device 1700 further includes a power supply 1790 (such as a battery) supplying power to the components. The power supply may be logically connected to the processor 1780 by using a power management system, thereby implementing functions such as charging, discharging and power consumption management by using the power management system. The power supply 1790 may further include one or more than one direct current or alternating current power supply, re-charging system, power failure detection circuit, power supply converter or inverter, power supply state indicator, and any other components.

Although not shown in the figure, the device 1700 may further include a camera, a Bluetooth module and the like, which are not further described herein.

The device 1700 further includes a memory and one or more than one program, and the one or more programs are stored in the memory, and are configured to be executed by one or more than one processor, so that the apparatus 1700 may perform the foregoing device control method that is performed by the second terminal.

Figure 18:
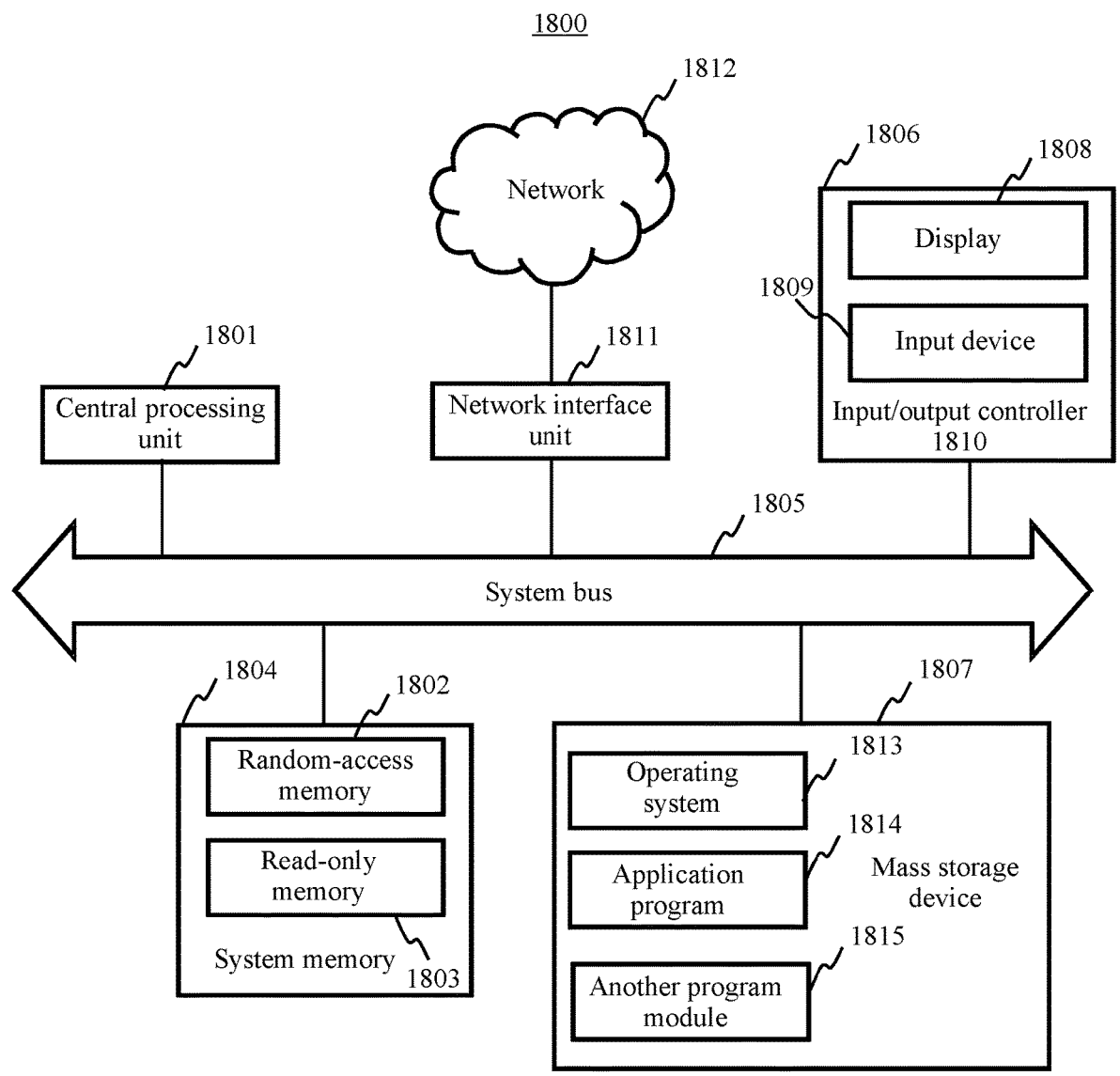
FIG. 18 is a structure schematic diagram of a server provided by an exemplary embodiment.

Please refer to FIG. 18 that shows a structure schematic diagram of a server provided by an exemplary embodiment. The server is configured to implement the device control method provided by the foregoing exemplary embodiment. Specifically:

The server 1800 includes a central processing unit (CPU) 1801, a system memory 1804 including a random-access memory (RAM) 1802 and a read-only memory (ROM) 1803, and a system bus 1805 that connects the system memory 1804 with the central processing unit 1801. The server 1800 further includes a basic input/output system (I/O system) 1806 that helps in transmitting information among various devices in a computer, and a mass storage device 1807 configured to store an operating system 1813, an application program 1814 and another program module 1815.

The basic input/output system 1806 includes a display 1808 configured to display information and an input device 1809 configured to input information by the user, such as a mouse, a keyboard or the like. Both the display 1808 and the input device 1809 are connected to the central processing unit 1801 through an input/output controller 1810 connected to the system bus 1805. The basic input/output system 1806 may further include the input/output controller configured to receive and process input from a plurality of other devices, such as a keyboard, a mouse, an electronic stylus and the like. Similarly, the input/output controller 1810 also provides output to a display, a printer or other types of output devices.

The mass storage device 1807 is connected to the central processing unit 1801 through a mass storage controller (not shown) connected to the system bus 1805. The mass storage device 1807 and related computer readable media thereof provide non-volatile storage for the server 1800, i.e., the mass storage device 1807 may include computer readable media (not shown), such as a hard disk or CD-ROM drive, or the like.

Without loss of generality, the computer readable media may include computer storage media and communication media. The computer storage media include volatile, non-volatile, removable and non-removable media that are configured to store information, such as computer readable instructions, data structures, program modules or other data, and are implemented by using any method or technology. The computer storage media include an RAM, an ROM, an EPROM, an EEPROM, a flash memory or other solid-state storage technology, a CD-ROM, a DVD or other optical storage, a tape cartridge, a magnetic tape, a disk storage or other magnetic storage device. Certainly, A person skilled in the art may know that the computer storage media are not limited to those above. The foregoing system memory 1804 and mass storage device 1807 may be collectively called memories.

According to various exemplary embodiments, the server 1800 may also be connected to a remote computer on a network through a network (such as the Internet or the like) and operate on the remote computer, i.e., the server 1800 may be connected to a network 1812 through a network interface unit 1811 connected to the system bus 1805, and may also be connected to another type of network or remote computer system (not shown) by using the network interface unit 1811.

The memory further includes one or more than one program, and the one or more than one program is stored in the memory, and is configured to be executed by one or more than one processor. The one or more than one program includes an instruction for performing the device control method.

In an exemplary embodiment, a non-transitory computer readable storage medium including instructions, for example, a storage device including instructions, is further provided. The foregoing instructions may be executed by a processor of a gateway to implement the steps that are performed by the primary gateway in the device control method as shown in various exemplary embodiments, or the instructions may be executed by a processor of a gateway to implement the steps that are performed by the secondary gateway in the device control method as shown in various exemplary embodiments, or the instructions may be executed by a processor of a terminal to implement the steps that are performed by the first terminal or the second terminal in the device control method as shown in various exemplary embodiments, or the instructions may be executed by a processor of a control center device to implement the steps that are performed by the control center device in the device control method as shown in various exemplary embodiments. For example, the non-transitory computer readable storage medium may be an ROM, an RAM, a CD-ROM, a magnetic tape, a floppy disk, an optical data storage device and the like.

After considering the specification and practicing the present disclosure, a person skilled in the art would easily conceive of other implementations of this application. This application is intended to cover any variations, uses, or adaptive changes of this application. Such variations, uses, or adaptive changes follow the general principles of this application and include common general knowledge or common technical means in the art that is not described in this application. The specification and the exemplary embodiments are merely exemplary, and the real scope and spirit of this application are set forth in the following claims.

It should be understood that this application is not limited to the precise structures described above and shown in the accompanying drawings, and various modifications and changes may be made without departing from the scope of this application. The scope of the application is limited only by the appended claims.

What is claimed is:

1. A system comprising:
a primary gateway communicating according to a first communication standard;
a secondary gateway communicating according to a second communication standard different from the first communication standard; and
a plurality of smart devices, a first portion of which belong to and communicate with the primary gateway using the first communication standard, and a second portion of which belong to and communicate with the secondary gateway using the second communication standard;
wherein:
the secondary gateway is configured to receive status information from each smart device belonging to the secondary gateway, and provide the status information of the smart devices belonging to the secondary gateway to the primary gateway;
the primary gateway is configured to receive status information from each smart device belonging to the primary gateway;
the primary gateway is configured to:
generate a control instruction for controlling a second smart device of the plurality of smart devices in response to detecting that status information from a first smart device of remaining smart devices of the plurality of smart devices complies with an interworking rule, the first smart device and the second smart device communicating using different communication standards; and
transmit the control instruction to the second smart device which executes the control instruction,
wherein
the primary gateway is further configured to:
provide device information of the second smart device to a first terminal, the first terminal sharing a control right on the first smart device, and the first smart device and the second smart device being bound to a same user account number;
receive a control application request comprising an operation that is to be performed on the second smart device, from the first terminal;
in response to receiving the control application request, transmit a request for permission to perform the operation to a second terminal corresponding to the user account number; and
in response to receiving a response indicating the permission from the second terminal, perform the operation.

2. The system according to claim 1, wherein the primary gateway is configured to:
when a gateway corresponding to the second smart device is the primary gateway, transmit the control instruction to the second smart device using the first communications standard; and
when the gateway corresponding to the second smart device is the secondary gateway, transmit the control instruction to the secondary gateway, wherein the secondary gateway transmits the control instruction to the second smart device using the second communications standard.

3. A method executed by a primary gateway, the method comprising:
obtaining status information from a plurality of smart devices, a first portion of which belong to and communicate with the primary gateway using a first communication standard, and a second portion of which belong to and communicate with a secondary gateway using a second communication standard different from the first communication standard, wherein the status information from the smart devices belonging to the secondary gateway is received from the secondary gateway, and the status information from the smart devices belonging to the primary gateway is received directly from the smart devices belonging to the primary gateway;
generating a control instruction for controlling a second smart device of the plurality of smart devices in response to detecting that status information from a first smart device of remaining smart devices of the plurality of smart devices complies with an interworking rule, the first smart device and the second smart device communicating using different communication standards; and
transmit the control instruction to the second smart device,
wherein the method further comprises:
when there is more than one secondary gateway, transmitting an instruction to a second secondary gateway for instructing the second secondary gateway to transmit, to a third secondary gateway different from the second secondary gateway, status information from a smart device of the plurality of smart devices that belongs to the second secondary gateway; and
the obtaining status information comprises:
reading, from the third secondary gateway, the status information from the smart devices belonging to the second secondary gateway.

4. The method according to claim 3, wherein the transmitting comprises:

when a gateway corresponding to the second smart device is the primary gateway, transmitting the control instruction to the second smart device using the first communications standard; and when the gateway corresponding to the second smart device is the secondary gateway, transmitting the control instruction to the secondary gateway for forwarding the specified control instruction to the second smart device using the second communications standard.

5. The method according to claim 3, wherein the method further comprises: sending a backup request to a server for instructing the server to back up the specified interworking rule.

6. The method according to claim 3, wherein the secondary gateway is a first secondary gateway, and the method further comprises:

transmitting a first instruction to a second secondary gateway for instructing the second secondary gateway to detect whether the status information from the first smart device complies with the specified interworking rule; and receiving a detection result from the second secondary gateway.

7. The method according to claim 3, wherein the primary gateway and the secondary gateway communicate with each other by using a third communications standard, and the primary gateway communicates with a smart device of the plurality of smart devices that supports the third communications standard.

8. The method according to claim 3, wherein the method further comprises:

providing device information of the second smart device to a first terminal, the first terminal sharing a control right on the first smart device, and the first smart device and the second smart device being bound to a same user account number;

receiving a control application request comprising an operation that is to be performed on the second smart device, from the first terminal;

in response to receiving the control application request, transmitting a request for permission to perform the specified operation to a second terminal corresponding to the user account number; and in response to receiving a response indicating the permission from the second terminal, performing the specified operation.

9. A primary gateway comprising:

at least one memory configured to store computer program code; and at least one processor configured to access the at least one memory and operate according to the computer program code, the computer program code including:

first obtaining code configured to cause the at least one processor to obtain status information from a plurality of smart devices, a first portion of which belong to and communicate with the primary gateway using a first communication standard, and a second portion of which belong to and communicate with a secondary gateway using a second communication standard different from the first communication standard, wherein the status information from the smart devices belonging to the secondary gateway is received from the secondary gateway, and the status information from the smart devices belonging to the primary gateway is received directly from the smart devices belonging to the primary gateway;

generation code configured to cause the at least one processor to generate a control instruction for controlling a second smart device of the plurality of smart devices in response to detecting that status information from a first smart device of remaining smart devices of the plurality of smart devices complies with an interworking rule, the first smart device and the second smart device communicating using different communication standards;

first sending code configured to cause the at least one processor to transmit the control instruction to the second smart device;

third sending code configured to cause the at least one processor to, when there is more than one secondary gateway, transmit an instruction to a second secondary gateway for instructing the second secondary gateway to transmit, to a third secondary gateway different from the second secondary gateway, status information from a smart device of the plurality of smart devices that belongs to the second secondary gateway; and the first obtaining code is further configured to cause the at least one processor to read, from the third secondary gateway, the status information from the smart devices belonging to the second secondary gateway.

10. The primary gateway according to claim 9, wherein the transmitting code comprises:

first sending subcode configured to cause the at least one processor to, when a gateway corresponding to the second smart device is the primary gateway, transmit the control instruction to the second smart device using the first communications standard; and second sending subcode configured to cause the at least one processor to, when the gateway corresponding to the second smart device is the secondary gateway, transmit the control instruction to the secondary gateway for forwarding the specified control instruction to the second smart device using the second communications standard.

11. The primary gateway according to claim 9, wherein the computer program code further comprises:

backup code configured to cause the at least one processor to transmit a backup request to a server for instructing the server to back up the specified interworking rule.

12. The primary gateway according to claim 9, wherein the secondary gateway is a first secondary gateway, and the computer program code further comprises:

second sending code configured to cause the at least one processor to transmit a first instruction to a second secondary gateway for instructing the second secondary gateway to detect whether the status information from the first smart device complies with the specified interworking rule; and second receiving code configured to cause the at least one processor to receive a detection result from the second secondary gateway.

13. The primary gateway according to claim 9, wherein the primary gateway and the secondary gateway communicate with each other by using a third communications standard, and the primary gateway communicates with a smart device of the plurality of smart devices that supports the third communications standard.

14. The primary gateway according to claim 9, wherein the computer program code further comprises:

information providing code configured to cause the at least one processor to provide device information of the second smart device to a first terminal, the first terminal sharing a control right on the first smart device, and the first smart device and the second smart device being bound to a same user account number;

request receiving code configured to cause the at least one processor to receive a control application request comprising an operation that is to be performed on the second smart device, from the first terminal;

prompt code configured to cause the at least one processor to, in response to receiving the control application request, transmit a request for permission to perform the specified operation to a second terminal corresponding to the user account number; and performing code configured to cause the at least one processor to, in response to receiving a response indicating the permission from the second terminal, perform the specified operation.

15. The system according to claim 1, wherein the smart devices are smart household devices.

16. The system according to claim 1, wherein the first and second communication standards are each short-range wireless communication standards.

* * * * *